US012306298B2

(12) United States Patent
Weikersdorfer et al.

(10) Patent No.: US 12,306,298 B2
(45) Date of Patent: *May 20, 2025

(54) SENSOR FUSION USING ULTRASONIC SENSORS FOR AUTONOMOUS SYSTEMS AND APPLICATIONS

(71) Applicant: NVIDIA Corporation, Santa Clara, CA (US)

(72) Inventors: David Weikersdorfer, Mountain View, CA (US); Qian Lin, Berkeley, CA (US); Aman Jhunjhunwala, Toronto (CA); Emilie Lucie Eloïse Wirbel, Nogent-sur-Marne (FR); Sangmin Oh, San Jose, CA (US); Minwoo Park, Saratoga, CA (US); Gyeong Woo Cheon, San Jose, CA (US); Arthur Henry Rajala, Greenville, OH (US); Bor-Jeng Chen, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 18/060,376

(22) Filed: Nov. 30, 2022

(65) Prior Publication Data

US 2024/0176017 A1 May 30, 2024

(51) Int. Cl.
*G01S 15/931* (2020.01)
*G01S 15/04* (2006.01)
(Continued)

(52) U.S. Cl.
CPC ............ *G01S 15/931* (2013.01); *G01S 15/86* (2020.01); *G01S 15/04* (2013.01); *G01S 15/06* (2013.01); *G01S 2015/938* (2013.01)

(58) Field of Classification Search
CPC .. G01S 15/86; G01S 15/931; G01S 2015/938; G01S 15/06; G01S 15/04
See application file for complete search history.

(56) References Cited

U.S. PATENT DOCUMENTS 10,871,783 B2 * 12/2020 Julian .................... G06T 7/246
11,393,097 B2 *  7/2022 Brunner .................. G06T 7/20
(Continued)

OTHER PUBLICATIONS

Pan, et al.; "Particle-Based Hazard Detection for Autonomous Machine Applications", U.S. Appl. No. 17/454,389, filed Nov. 10, 2021.

(Continued)

*Primary Examiner* — Daniel L Murphy
*Assistant Examiner* — Amie M Ndure
(74) *Attorney, Agent, or Firm* — Taylor English Duma L.L.P.

(57) ABSTRACT

In various examples, techniques for sensor-fusion based object detection and/or free-space detection using ultrasonic sensors are described. Systems may receive sensor data generated using one or more types of sensors of a machine. In some examples, the systems may then process at least a portion of the sensor data to generate input data, where the input data represents one or more locations of one or more objects within an environment. The systems may then input at least a portion of the sensor data and/or at least a portion of the input data into one or more neural networks that are trained to output one or more maps or other output representations associated with the environment. In some examples, the map(s) may include a height, an occupancy, and/or height/occupancy map generated, e.g., from a birds-eye-view perspective. The machine may use these outputs to perform one or more operations.

20 Claims, 19 Drawing Sheets

(51) Int. Cl.
*G01S 15/06* (2006.01)
*G01S 15/86* (2020.01)

(56) References Cited

U.S. PATENT DOCUMENTS

| | | | |
|---|---|---|---|
| 11,548,533 B2* | 1/2023 | Liang | G06N 20/00 |
| 2012/0209505 A1* | 8/2012 | Breed | G01C 21/3697 |
| | | | 701/408 |
| 2019/0025853 A1* | 1/2019 | Julian | G06V 10/82 |
| 2020/0219264 A1* | 7/2020 | Brunner | G01S 7/4808 |
| 2020/0298891 A1* | 9/2020 | Liang | G06N 5/04 |
| 2021/0406560 A1* | 12/2021 | Park | G06T 7/70 |
| 2023/0095410 A1* | 3/2023 | Costea | G01S 17/931 |
| | | | 356/5.01 |
| 2024/0176018 A1 | 5/2024 | Weikersdorfer et al. | |

OTHER PUBLICATIONS

Oh, et al.; "Hazard Detection Using Occupancy Grids for Autonomous Systems and Applications," U.S. Appl. No. 17/695,621, filed Mar. 15, 2022.
Weikersdorfer, David; Non-Final Office Action for U.S. Appl. No. 18/060,444, filed Nov. 30, 2022, mailed Oct. 17, 2024, 26 pgs.
Weikersdorfer, David; Notice of Allowance for U.S. Appl. No. 18/060,444, filed Nov. 30, 2022, mailed Feb. 20, 2025, 12 pgs.

* cited by examiner

SENSOR FUSION USING ULTRASONIC SENSORS FOR AUTONOMOUS SYSTEMS AND APPLICATIONS

BACKGROUND

Generating maps or other environmental representations—such as free-space maps and occupancy maps—is essential for autonomous and/or semi-autonomous machine navigation. For instance, these dynamically generated representations of the environment may include a birds-eye-view (BEV) perspective of an area surrounding an autonomous and/or semi-autonomous machine, where the BEV map indicates locations of static and/or dynamic objects that are proximate to the autonomous and/or semi-autonomous machine and/or indicates drivable (e.g., free-space) and non-drivable regions of the environment. As such, the autonomous and/or semi-autonomous machine may use this information to determine the locations of the objects within the environment as well as where the machine is capable of navigating, and may use this information to determine planning and control operations for navigating safely through the environment.

Conventional systems have used image-based approaches to generate free-space and/or occupancy maps or representations. For instance, some image-based approaches include processing image data generated using one or more cameras of an autonomous and/or semi-autonomous machine in order to project and/or transform the locations of objects onto a top-down (e.g., bird-eye-view) map. Other image-based approaches predict semantic map representations from images using pyramid occupancy networks, where these semantic map representations include grid maps indicating the locations of objects within an environment. However, such image-based approaches may generate less reliable free-space and/or occupancy maps due to the inaccuracy associated with using image data alone for distance or depth determinations.

Other approaches for determining occupancy include using LiDAR or RADAR to generate heatmaps indicating locations of objects within an environment. For instance, RADAR data or LiDAR data, which may be represented using point clouds, may be processed in order to determine the locations of the objects within the environment. A heatmap, which may include a BEV map, is then generated that indicates the locations of the objects relative to the autonomous and/or semi-autonomous machine. However, using LiDAR or RADAR alone may also generate less reliable maps based on noise and/or errors within the processing. Additionally, generating such heatmaps using LiDAR may require increased compute and expense, as LiDAR data may be more compute intensive to process and LiDAR sensors may generally be more expensive than other sensor types (e.g., RADAR, camera, etc.).

SUMMARY

Embodiments of the present disclosure relate to sensor fusion-based object and/or free-space detection using ultrasonic sensors for autonomous or semi-autonomous systems and applications. Systems and methods are disclosed that generate a map(s) and/or other representation, such as a height map, an occupancy map, a height/occupancy map, a projection image, and/or a distance map, using sensor data generated using one or more types of sensors, such as an ultrasonic sensor(s), a RADAR sensor(s), an image sensor(s), a LiDAR sensor(s), and/or the like. For instance, the systems and methods may process the sensor data using one or more neural networks that are trained to generate the output representations (e.g., map, in embodiments). In some examples, the systems and methods may process at least a portion of the sensor data before inputting the sensor data into the neural network(s). For instance, the sensor data may be pre-processed in order to generate input data indicating a location(s) (e.g., a distance(s), an angle(s), a pose(s), etc.) of an object(s) relative to an ego-machine. The neural network(s) may then process the sensor data and/or the pre-processed input data to generate the output representation(s).

In contrast to conventional systems, such as those described above, the present systems and methods, in some embodiments, may process sensor data generated using multiple types of sensors in order to generate a map(s) and/or other sensor data representation type, such as an occupancy map, a height map, object detections (e.g., bounding shape locations, poses, etc.), and/or a projection image (e.g., projecting output detections, such as bounding shapes, from three-dimensional (3D) space onto a two-dimensional (2D) image). This provides improvements over conventional systems that use sensor data from a single type of sensor, such as a camera, a RADAR sensor, or a LiDAR sensor, where such outputs may be less reliable based on errors and/or noise and/or may require a large amount of computing resources, such as when LiDAR is used to generate the output representations. Additionally, in some embodiments, this provides improvements over the conventional systems by generating different types of maps, such as a height map, which may also be used by vehicles when navigating.

Furthermore, in contrast to conventional systems, the current systems, in some examples, may use new types of sensors, such as an ultrasonic sensor(s), to generate the output representations (e.g., map(s)). In some examples, the neural network(s) generates a more accurate map(s) using the sensor data generated using the ultrasonic sensor(s)—in addition to sensor data from one or more other sensor types via sensor fusion—based on the accuracy of the sensor data, such as the accuracy with regard to the distances to objects within the environment and/or the accuracy with regard to heights of navigable surfaces (e.g., the driving surface or ground plane). Additionally, in some embodiments, generating the map(s) or other output representations using the ultrasonic sensor(s), in addition to or alternatively from other types of sensors, such as LiDAR sensors, may require less computing resources.

BRIEF DESCRIPTION OF THE DRAWINGS

The present systems and methods for sensor fusion-based object and/or free-space detection using ultrasonic sensors for autonomous or semi-autonomous systems and applications are described in detail below with reference to the attached drawing figures, wherein.

DETAILED DESCRIPTION

Figure 1:
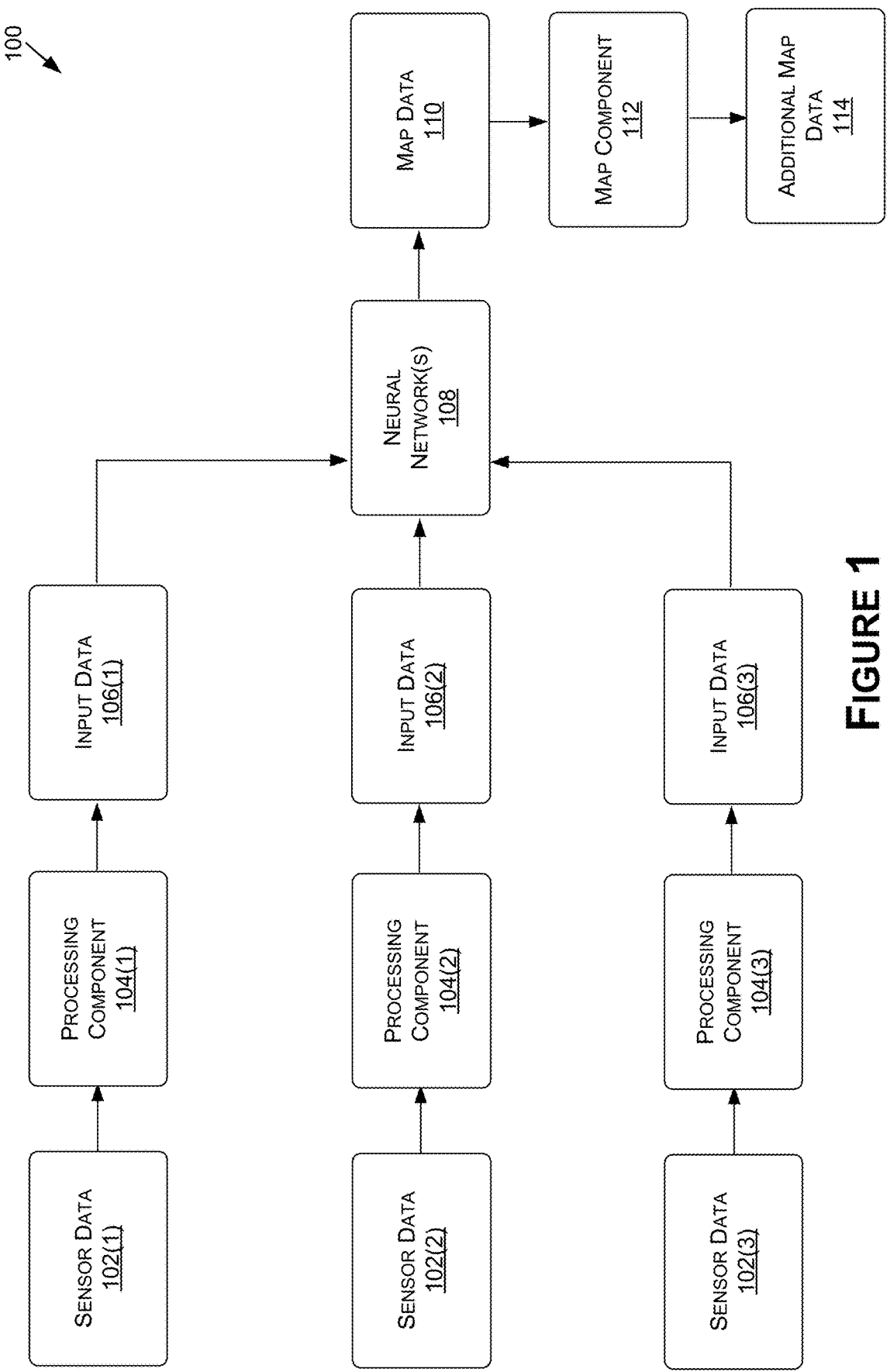
FIG. 1 illustrates an example data flow diagram for a process of generating a map(s) and/or other output representation(s) using a neural network(s) and sensor data generated using one or more types of sensors, in accordance with some embodiments of the present disclosure.

Systems and methods are disclosed related to sensor fusion-based object and/or free-space detection using ultrasonic sensors for autonomous or semi-autonomous systems and applications. Although the present disclosure may be described with respect to an example autonomous or semi-autonomous vehicle or machine 900 (alternatively referred to herein as "vehicle 900," "machine 900," "ego-vehicle 900," or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to maps (e.g., height maps, occupancy maps, distance maps, etc.), this is not intended to be limiting, and the systems and methods described herein may be used in augmented reality, virtual reality, mixed reality, robotics, security and surveillance, autonomous or semi-autonomous machine applications, and/or any other technology spaces where maps may be used. Further, although primarily described as generating map data or maps—such as dynamically generated occupancy maps, free-space maps, etc.—this is not intended to be limiting. For example, the neural network(s) described herein may be trained or configured to generate any type of output representation without departing from the scope of the present disclosure—e.g., regression outputs corresponding to 2D and/or 3D locations of bounding shapes or free-space boundaries, an occupancy and/or height grid, semantic and/or instance segmentation masks or maps corresponding to objects, actors, and/or free-space boundaries, confidence vectors corresponding to locations of bounding shapes and/or free-space boundaries, etc.

For instance, a system(s) may receive sensor data generated using one or more sensors, such as one or more ultrasonic sensors, one or more image sensors, one or more RADAR sensors, one or more LiDAR sensors, and/or one or more other types of sensors associated with a vehicle or machine. In some examples, the system(s) may then process at least a portion of the sensor data in order to generate input data. In such examples, the input data may represent one or more locations of one or more objects located within an environment. For instance, and for a frame represented by the sensor data, the system(s) may generate input data representing a top-down or BEV image or other sensor data representation (e.g., an unprojected envelope, a point cloud, etc.) that depicts, represents, or otherwise corresponds to the locations of the objects relative to the vehicle or machine. The system(s) may then input at least a portion of the sensor data and/or at least a portion of the input data into one or more neural networks that are trained to generate one or more maps, such as a height map(s), an occupancy map(s), a height/occupancy map(s), a distance map(s), and/or the like, and/or to generate one or more other output representations.

In some examples, the system(s) may input the sensor data and/or the input data associated with a single type of sensor into a neural network(s) that is trained to generate the map(s) and/or other output representation. For instance, the system(s) may input the sensor data and/or the input data associated with the ultrasonic sensor(s), the image sensor(s), or the RADAR sensor(s) into the neural network(s). In some examples, the system(s) may input the sensor data and/or the input data associated with more than one type of sensor into a neural network(s) that is trained to generate the map(s) and/or the other output representation. For instance, the system(s) may input the sensor data and/or the input data associated with two or more of the ultrasonic sensor(s), the image sensor(s), and/or the RADAR sensor(s) into the neural network(s). Still, in some examples, the system(s) may input the sensor data and/or the input data into separate neural networks that are trained to generate the map(s) and/or other output representation. For instance, the system(s) may input the sensor data and/or the input data associated with a first type of sensor into a first neural network(s) that is trained to generate a first map(s), input the sensor data and/or the input data associated with a second type of sensor into a second neural network(s) that is trained to generate a second map(s), and/or so forth.

As described herein, the neural network(s) may be trained to process the sensor data and/or the input data and, based on the processing, output the map(s) and/or other output representation. In some examples, the neural network(s) may be trained to output at least a height map (e.g., a top-down height map, birds-eye-view (BEV) height map, etc.) and an occupancy map (e.g., a top-down occupancy map, a BEV occupancy map, etc.). In some examples, the neural network(s) may be trained to output a combined height and occupancy map (e.g., a top-down height/occupancy map, a BEV height/occupancy map, etc.). Still, in some examples, the neural network(s) may be trained to output a height map (e.g., a top-down height map, a BEV height map, etc.), where the systems(s) then perform one or more post-processing techniques in order to generate an occupancy map (e.g., a top-down occupancy map, a BEV occupancy map, etc.) using the height map.

For instance, to generate the occupancy map, the system(s) may analyze the height map to determine first locations (e.g., first pixels, first cells, first points, etc.) of the height map that are less than a first threshold height. The first threshold height may include, but is not limited to, five centimeters, ten centimeters, fifteen centimeters, and/or the like. The system(s) may also analyze the height map to determine second locations (e.g., second pixels, second cells, second points, etc.) of the height map that are between the first threshold height and a second, higher threshold height. The second threshold height may include, but is not limited to, fifteen centimeters, twenty-one centimeters, thirty centimeters, and/or the like. Furthermore, the system(s) may analyze the height map to determine third locations (e.g., third pixels, third cells, third points, etc.) of the height map that are greater than the second threshold height. The system(s) may then generate the occupancy map using the first locations, the second locations, and/or the third locations.

For instance, the system(s) may generate the occupancy map such that the occupancy map indicates that the first locations include drivable surfaces (e.g., the first locations are not occluded), the second locations may include drivable surfaces (e.g., the second locations may include a curb and/or other object that may be drivable), and the third locations include non-drivable surfaces (e.g., the third locations are occluded). While this is just one example technique of how the system(s) may generate the occupancy map using the height map, in other examples, the system(s) may use one or more additional and/or alternative techniques to generate the occupancy map using the height map.

The systems and methods described herein may be used by, without limitation, non-autonomous vehicles, semi-autonomous vehicles (e.g., in one or more adaptive driver assistance systems (ADAS)), autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example data flow diagram for a process 100 of generating a map(s) and/or other output representation using a neural network(s) and sensor data generated using a type(s) of sensor(s), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 may include generating, obtaining, and/or receiving sensor data 102(1)-(3) (also referred to as "sensor data 102") generated using one or more sensors. As described herein, the sensor data 102 may be generated using one or more different types of sensors associated with a vehicle. For example, the sensor data 102(1) may be generated using one or more ultrasonic sensors of the vehicle, the sensor data 102(2) may be generated using one or more image sensors of the vehicle, and/or the sensor data 102(3) may be generated using one or more RADAR sensors of the vehicle. However, in other examples, the sensor data 102 may be generated using one or more additional and/or alternative types of sensors—e.g., one or more LiDAR sensors. In some examples, the sensor data 102 is generated using a specific frame rate, such as, but not limited to, fifteen frames per second, thirty frames, per second, sixty frames per second, and/or any other frame rate. Different sensors may have different frame rates, in embodiments, and the sensor data used at any given iteration may be selected and/or transformed (e.g., ego-motion compensated) such that the sensor data from different modalities that may have different frame rates corresponds to substantially a same time.

The process 100 may include processing at least a portion of the sensor data 102 using one or more processing components 104(1)-(3) (also referred to singularly as "processing component 104" or in plural as "processing components 104"). For instance, and as shown, the processing component 104(1) may process the sensor data 102(1) in order to generate input data 106(1), the processing component 104(2) may process the sensor data 102(2) in order to generate input data 106(2), and the processing component 104(3) may process the sensor data 102(3) in order to generate input data 106(3). While the example of FIG. 1 illustrates three separate processing components 104 being used to process the sensor data 102, in other examples, the process 100 may use one or more processing units 104 to process the sensor data 102. Additionally, in some examples, and as described in more detail herein, at least a portion of the sensor data 102 may not be processed using a processing component 104 (e.g., raw sensor data 102 may be input into a neural network(s) 108, and/or minimally processed (e.g., demosaicing, color correction, etc.) sensor data 102 may be input into a neural network(s) 108).

In some examples, a processing component 104 may process sensor data 102 in order to generate input data 106 representative of one or more locations of one or more objects with respect to the vehicle or machine within the environment. For instance, the input data 106 may represent an image (e.g., a top-down image, a BEV image, etc.), a map (e.g., a top-down map, a BEV map, etc.), an envelope, a projection (e.g., a range image), and/or the like that indicates the one or more locations of the one or more objects relative to the vehicle or machine. In some examples, the processing component 104 may process every frame of the sensor data 102, every other frame of the sensor data 102, every fourth frame of the sensor data 102, every fifteenth frame of the sensor data 102, every thirtieth frame of the sensor data 102, and/or any other frame interval when generating the input data 106.

Figure 2A:
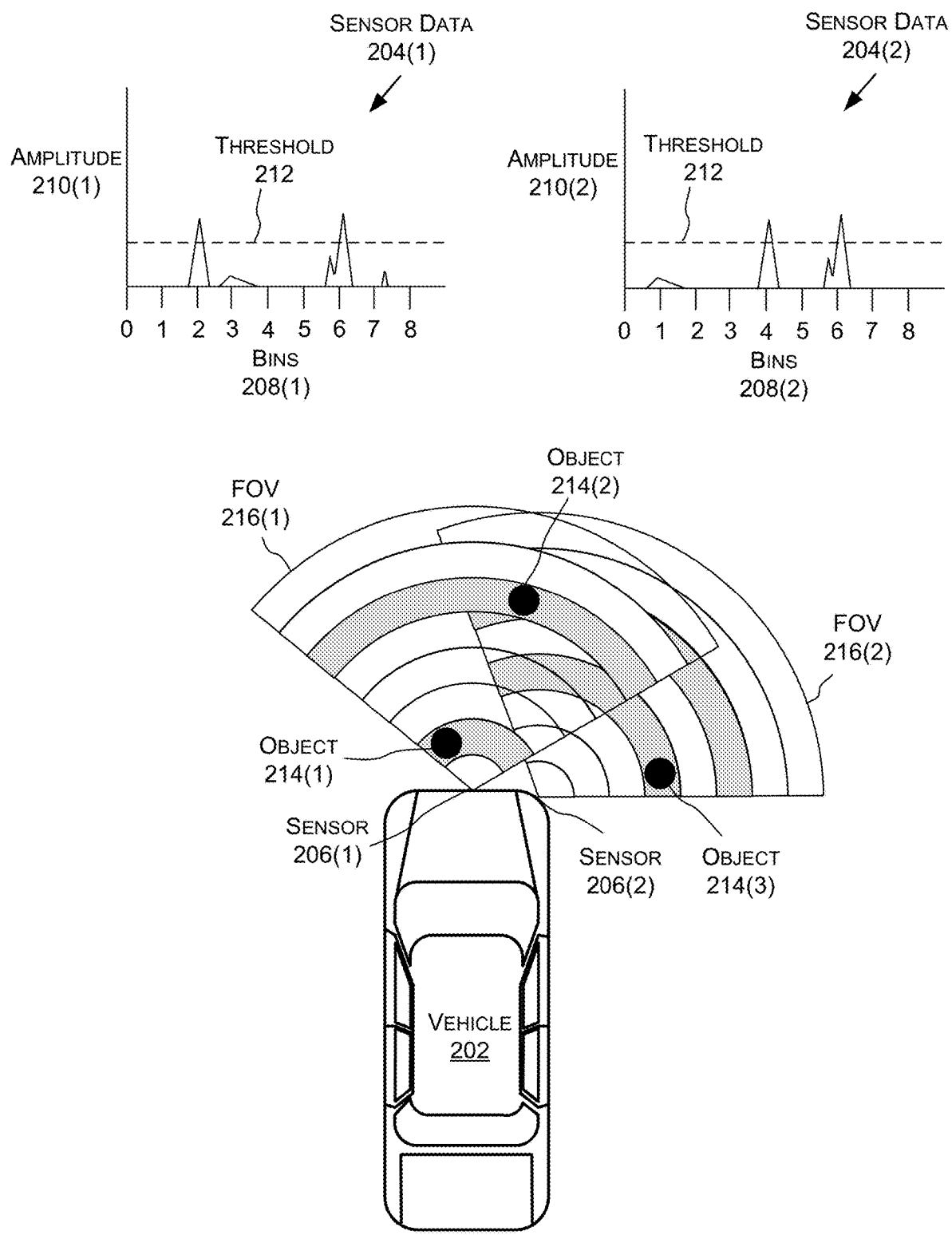
FIGS. 2A-2B illustrate an example of pre-processing sensor data in order to generate input data for a neural network(s), in accordance with some embodiments of the present disclosure.
Figure 2B:
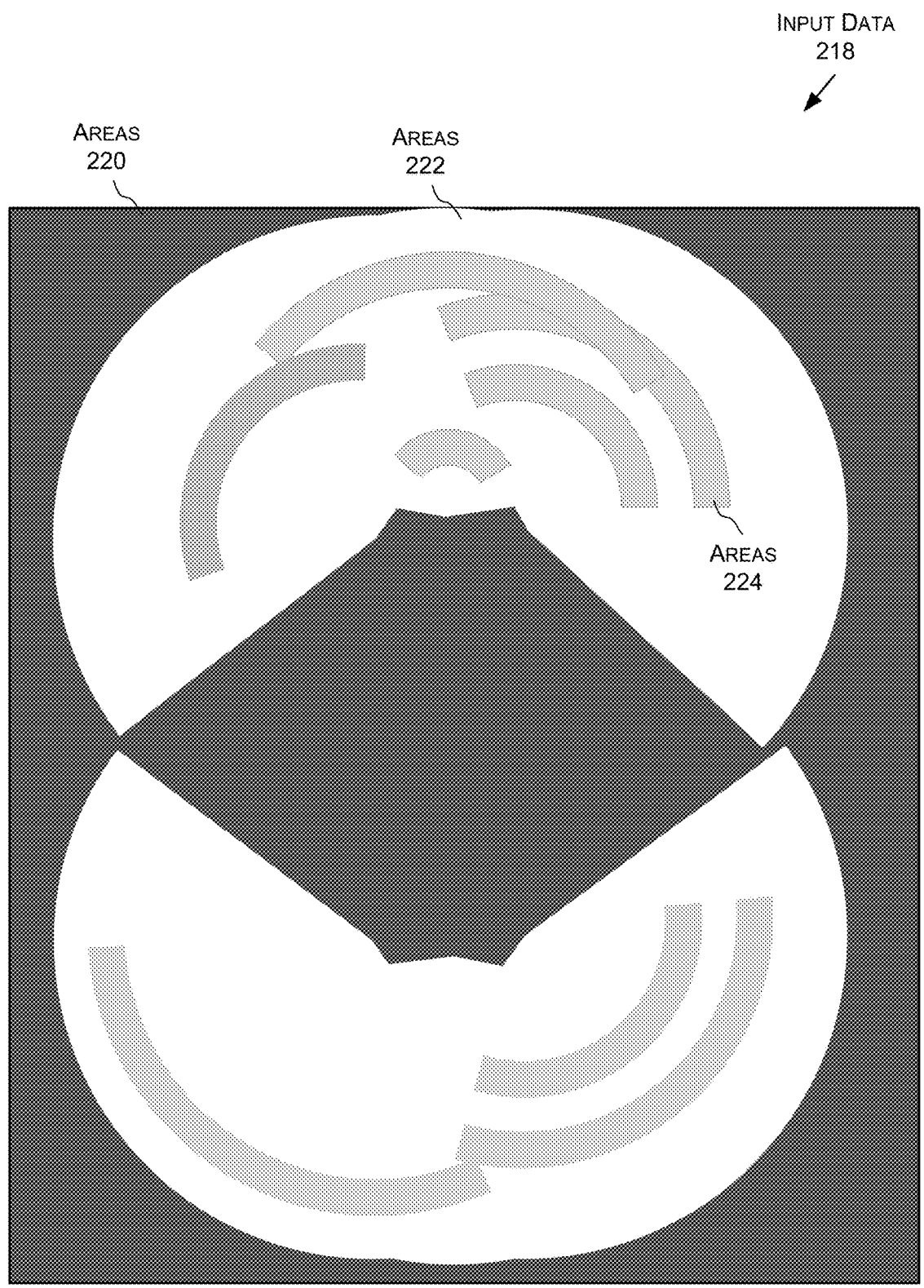

For instance, FIGS. 2A-2B illustrate an example of processing sensor data 102 in order to generate input data 106, in accordance with some embodiments of the present disclosure. The example of FIGS. 2A-2B may be associated with processing a specific type of sensor data 102, such as sensor data 102 generated using an ultrasonic sensor(s). For instance, in the example of FIG. 2A, a vehicle 202 may generate first sensor data 204(1) using a first sensor 206(1) and second sensor data 204(2) using a second sensor 206(2). As shown, the sensor data 204(1)-(2) may represent a frequency of one or more signals at various distances, where the distances are associated with bins 208(1)-(2) (also referred to singularly as "bin 208" or in plural as "bins 208"). For examples, each bin 208 may represent a specific distance, such as one centimeter, ten centimeters, fifty centimeters, one meter, two meters, and/or any other distance. While the example of FIG. 2A illustrates the sensor data 204 representing eight bins 208, in other examples, the sensor data 204 may represent any number of bins 208 (e.g., fifty bins 208, one hundred bins 208, two hundred bins 208, five hundred bins 208, etc.).

The processing component 104 may process the sensor data 204 to determine one or more distances to one or more objects located within the environment for which the vehicle 202 is located. To determine a distance to an object, the processing component 104 may use an amplitude 210(1)-(2) (also referred to singularly as "amplitude 210" or in plural as "amplitudes 210") associated with the frequencies. For example, the processing component 104 may determine that an object is associated with a bin 208 based on the amplitude 210 satisfying (e.g., being equal to or greater than) a threshold amplitude 212. For instance, and in the example of FIG. 2A, the processing component 104 may determine that there is a first object 214(1) associated with the first bin 208(1) and a second object 214(2) associated with the sixth bin 208(1) of the sensor data 204(1). Additionally, the processing component 104 may determine that there is a third object 214(3) associated with the fourth bin 208(2) and the second object 214(2) associated with the sixth bin 208(2) of the sensor data 204(2).

The processing component 104 may then determine the locations of the objects 214(1)-(3) within the environment based on fields of view (FOVs) (or sensory fields) 216(1)-(2) of the sensors 206(1)-(2) and the determined distances. For instance, and as discussed herein, each bin 208 may be associated with a specific distance from the sensor 206. For example, and as shown, the first bin 208(1) may be associated with a first distance represented by the first arc of the FOV 216(1), the second bin 208(1) may be associated with a second distance represented by the second arc of the FOV 216(1), the third bin 208(1) may be associated with a third distance represented by the third arc of the FOV 216(1), and/or so forth. As such, the processing component 104 may determine that the first object 214(1) is located within an area of the environment represented by the second arc of the FOV 216(1), which is indicated by the shading. Additionally, the processing component 104 may determine that the second object 214(2) is located within an area of the environment represented by the sixth arc of the FOV 216(1), which is also indicated by shading.

The processing component 104 may then use similar processes to determine the locations of the objects using the sensor data 204(2). For instance, the processing component 104 may determine that the third object 214(3) is located within an area of the environment represented by the fourth arc of the FOV 216(2), which is also indicated by shading. Additionally, the processing component 104 may determine that the second object 214(2) is located within an area of the environment represented by the sixth arc of the FOV 216(2), which is also indicated by shading. The processing component 104 may perform similar processes for one or more additional sensors (e.g., each sensor that generates the type of sensor data 204) of the vehicle 202, which are not illustrated for clarity reasons.

As illustrated in FIG. 2B, the processing component 104 may then generate input data 218 (which may represent, and/or include, the input data 106) based on the object locations determined using the example of FIG. 2A. As described herein, the input data 218 may represent an image (e.g., a top-down image, a BEV image, etc.), a map (e.g., a top-down map, a BEV map, etc.), an envelope, a projection, and/or the like. As shown, the input data 218 may represent areas 220 within the environment that are outside of the FOVs 216 of the sensors 206 that generated the sensor data 204, where the areas 220 are represented by dark shading in the example of FIG. 2B. In some examples, the areas 220 include the area of the vehicle 202 itself within the environment (e.g., the vehicle 202 is outside of the FOVs 216 of the sensors 206). The input data 218 may also represent areas 222 within the environment that are within the FOVs 216 of the sensors 206 that generated the sensor data 204, where the areas 222 are represented by white shading in the example of FIG. 2B. Furthermore, the input data 218 may represent areas 224 (although only one is labeled for clarity reasons) for which objects may be located within the environment, where the areas 224 are represented by light shading. While the example of FIG. 2B uses dark shading for the areas 220, white shading for the areas 222, and light shading for the areas 224, in other examples, the input data 218 may include any other type of shading, color, shape, pattern, indicator, and/or the like to represent or provide a visualization of one or more of the areas 220-224.

As described herein, in some examples, the processing component 104 may perform similar processes to continue processing the sensor data 204 in order to generate the input data 218. For instance, the processing component 104 may generate the input data 218 for every frame represented by the sensor data 204, every other frame represented by the sensor data 204, every fourth frame represented by the sensor data 204, every fifteenth frame represented by the sensor data 204, every thirtieth frame represented by the sensor data 204, and/or any other interval associated with the frames. Additionally, in some examples, the processing component 104 may generate multiple iterations of input data 218 for each frame represented by the sensor data 204.

Referring back to the example of FIG. 1, the processing component 104 may use similar and/or alternative techniques to process different types of sensor data 102. For instance, and as described herein, the processing component 104 may use the processes of FIGS. 2A-2B to process at least sensor data 102 generated using an ultrasonic sensor(s). However, the processing components 104 may perform one or more alternative techniques to process sensor data 102 generated using other types of sensors, such as an image sensor(s), a RADAR sensor(s), a LiDAR sensor(s), and/or the like, to generate the input data 106 associated with the other types of sensors.

For instance, and in some examples, sensor data 102 that includes image data may be captured in one format (e.g., RCCB, RCCC, RBGC, etc.), and then converted (e.g., during pre-processing of the image data) to another format. In some examples, the image data may be provided as input to a sensor data pre-processor (not shown) to generate pre-processed image data (discussed herein). Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor.

In some examples, before applying the sensor data 102, a processing component 104 may use image data representative of one or more images (or other data representations) and load the sensor data 102 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor.

In some embodiments, a pre-processing image pipeline may be employed by the processing component 104 to process a raw image(s) acquired by an image sensor(s) (e.g., camera(s)) and included in the image data to produce pre-processed image data which may represent the input data 106. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the processing component 104, it may include bilateral denoising in the Bayer domain. Where demosaicing is employed by the processing component 104, it may include bilinear interpolation. Where histogram computing is employed by the processing component 104, it may involve computing a histogram for the C channel, and may be merged with the decompanding or noise reduction in some examples. Where adaptive global tone mapping is employed by the processing component 104, it may include performing an adaptive gamma-log transform. This may include calculating a histogram, getting a mid-tone level, and/or estimating a maximum luminance with the mid-tone level.

In some examples, the processing components 104 process the sensor data 102 such that the input data 106 associated with each type of sensor data 102 is in the same latent space, such as a cartesian coordinate system, a polar coordinate system, and/or any other type of coordinate system. For example, a type(s) of sensor data 102, such as sensor data 102 generated by a RADAR sensor(s), an ultrasonic sensor(s), a LiDAR sensor(s), and/or the like, may be represented in a first type of latent space, such as cartesian coordinates. However, another type(s) of sensor data 102, such as sensor data 102 generated by an image sensor(s), may be represented in a second type of latent space, such as polar coordinates. As such, the processing components 104 may be configured to generate the input data 106 such that the input data 106 is represented in the same latent space, such as the cartesian coordinate system.

The process 100 may include processing the input data 106 (and/or the sensor data 102) using one or more neural networks 108. In some examples, and as illustrated by the example of FIG. 1, some or all of the input data 106 associated with some or all the different types of sensors may be input into the neural network(s) 108. However, in some examples, only a portion of the input data 106 associated with one or more types of sensors may be input into the neural network(s) 108. For a first example, the input data 106 associated with the ultrasonic sensor(s), the input data 106 associated with the RADAR sensor(s), or the input data 106 associated with the image sensor(s) may be input into the neural network(s) 108. For a second example, the input data 106 associated with the image sensor(s) and the ultrasonic sensor(s) may be input into the neural network(s) 108, the input data 106 associated with the ultrasonic sensor(s) and the RADAR sensor(s) may be input into the neural network(s) 108, or the input data 106 associated with the image sensor(s) and the RADAR sensor(s) may be input into the neural network(s) 108.

While the example of FIG. 1 illustrates the input data 106 as being input into the neural network(s) 108, in other examples, the sensor data 102 may additionally, and/or alternatively, be input into the neural network(s) 108. Additionally, while the example of FIG. 1 illustrates the input data 106 (and/or the sensor data 102) being input into the same neural network(s) 108, in other examples, the input data 106 (and/or the sensor data 102) may be input in separate neural networks 108. For a first example, the input data 106(1) (and/or the sensor data 102(1)) may be input into a first neural network(s) 108, the input data 106(2) (and/or the sensor data 102(2)) may be input into a second neural network(s) 108, and/or the input data 106(3) (and/or the sensor data 102(3)) may be input into a third neural network(s) 108. In other words, any combination of the input data 106 (and/or the sensor data 102) may be input into any number of neural network(s) 108.

In some examples, the input data 106 (and/or the sensor data 102) may be combined (e.g., fused) before input into the neural network(s) 108. For instance, and as described herein, the input data 106 may represent an image or other representation (e.g., a top-down image, a BEV image, a projection or range image, etc.), a map (e.g., a top-down map, a BEV map, etc.), an envelope, a projection, a grid, and/or the like representing the locations of objects within the environment. As such, the images, the maps, the envelopes, the projections, the grid, and/or the like represented by the input data 106 may be combined (e.g., fused) in order to generate a combined input for the neural network(s) 108. As such, in some examples, the combined input may represent a grid of maps, envelopes, projections, and/or the like.

As described herein, the neural network(s) 108 may be trained to process the input data 106 (and/or the sensor data 102) and, based on the processing, output map data 110 associated with an environment. The map data 110 may include, but is not limited to, a height map(s), an occupancy map(s), a height/occupancy map(s), a distance map(s), and/or the like. In some examples, one or more of the maps may include a BEV map, a top-down map, and/or the like. In some examples, the neural network(s) 108 may be trained to output a single map, such as a single occupancy map, a single height map, a single height/occupancy map, or a single distance map. In some examples, the neural network(s) may be trained to output multiple maps and/or other output representations. For a first example, the neural network(s) 108 may be trained to output height map and an occupancy map. For a second example, the neural network(s) 108 may be trained to output multiple height maps, such as a first height map associated with the input data 106(1), a second height map associated with the input data 106(2), and/or so forth.

Figure 3A:
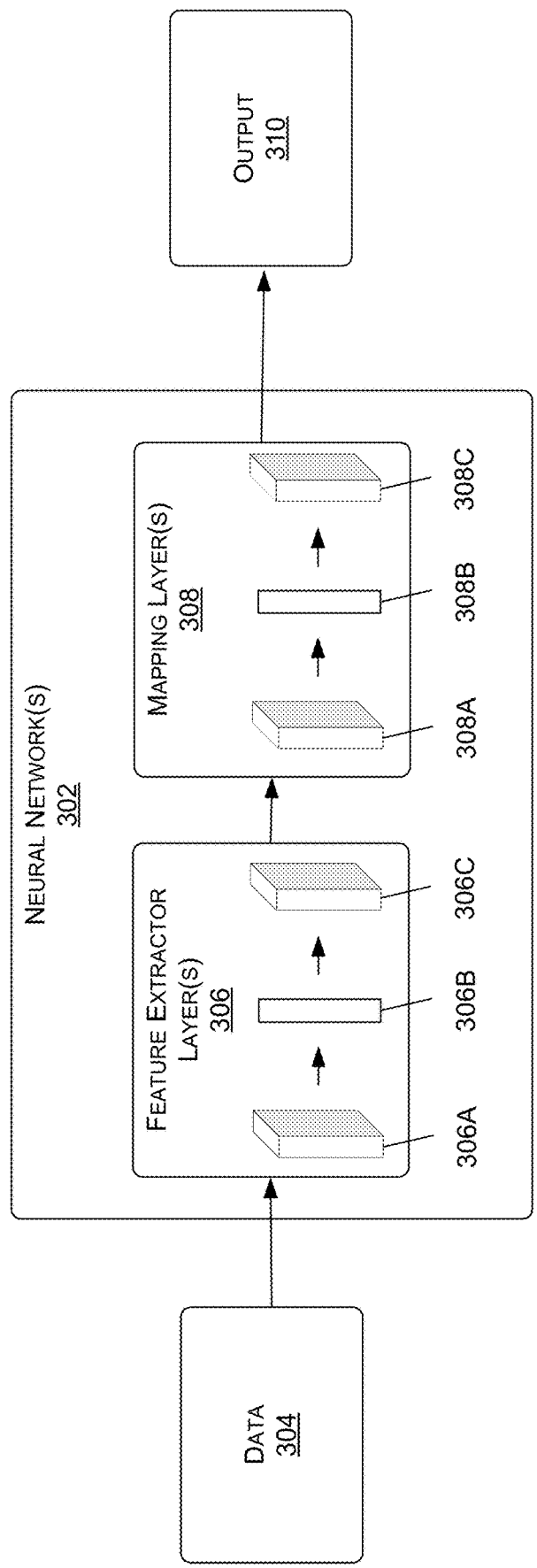
FIGS. 3A-3C illustrate example neural networks for processing data in order to generate a map(s) and/or other output representation(s), in accordance with some embodiments of the present disclosure.

For instance, FIG. 3A is an illustration of an example neural network(s) 302 (which may represent, and/or include, the neural network(s) 108), in accordance with some embodiments of the present disclosure. The neural network(s) 302 may be one example of a machine learning model that may be used to perform one or more of the processes described herein. The neural network(s) 302 may include or be referred to as a convolutional neural network(s) and/or a deep neural network(s) and thus may alternatively be referred to herein as a convolutional neural network(s) 302, a convolutional network(s) 302, a CNN(s) 302, a deep neural network(s) 302, or a DNN(s) 302.

As described herein, the neural network(s) 302 may use data 304 as an input. In some examples, the data 304 may include the sensor data 102(1), the sensor data 102(2), the sensor data 102(3), the input data 106(1), the input data 106(2), and/or the input data 106(3). The data 302 may be input into a feature extractor layer(s) 306 of the neural network(s) 302. The feature extractor layer(s) 306 may include any number of layers 306, such as the layers 306A-306C. One or more of the layers 306 may include an input layer. The input layer may hold values associated with the data 304. For example, when the data 304 is an image(s), the input layer may hold values representative of the raw pixel values of the image(s) as a volume (e.g., a width, W, a height, H, and color channels, C (e.g., RGB), such as 32.times.32.times.3), and/or a batch size, B (e.g., where batching is used).

One or more layers 306 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 306 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 306 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the neural network 302 may not include any pooling layers. In such examples, other types of convolution layers may be used in place of pooling layers. In some examples, the feature extractor layer(s) 306 may include alternating convolutional layers and pooling layers.

One or more of the layers 306 may include a fully connected layer. Each neuron in the fully connected layer(s) may be connected to each of the neurons in the previous volume. The fully connected layer may compute class scores, and the resulting volume may be 1×1×N (where N is a number of classes). In some examples, the feature extractor layer(s) 306 may include a fully connected layer, while in other examples, the fully connected layer of the neural network(s) 302 may be the fully connected layer separate from the feature extractor layer(s) 306. In some examples, no fully connected layers may be used by the feature extractor layer(s) 306 and/or the neural network(s) 302 as a whole, in an effort to increase processing times and reduce computing resource requirements. In such examples, where no fully connected layers are used, the neural network(s) 302 may be referred to as a fully convolutional network.

One or more of the layers 306 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images to the neural network(s) 302, or used to up-sample to the input spatial resolution of a next layer.

Although input layers, convolutional layers, pooling layers, ReLU layers, deconvolutional layers, and fully connected layers are discussed herein with respect to the feature extractor layer(s) 306, this is not intended to be limiting. For example, additional or alternative layers 306 may be used in the feature extractor layer(s) 306, such as normalization layers, SoftMax layers, and/or other layer types.

The output of the feature extractor layer(s) 306 may be an input to mapping layer(s) 308. The mapping layers 308A-C may use one or more of the layer types described herein with respect to the feature extractor layer(s) 306. As described herein, the mapping layer(s) 308 may not include any fully connected layers, in some examples, to reduce processing speeds and decrease computing resource requirements. In such examples, the mapping layer(s) 308 may be referred to as fully convolutional layers.

Different orders and numbers of the layers 306 and 308 of the neural network(s) 302 may be used, depending on the embodiment. For example, where two or more different types of sensors or other sensor types are used to generate inputs, there may be a different order and number of layers 306 and 308 for one or more of the sensors. As another example, different ordering and numbering of layers may be used depending on the type of sensor used to generate the data 304, or the type of the data 304 (e.g., RGB, YUV, etc.). As such, the order and number of layers 306 and 308 of the neural network(s) 302 is not limited to any one architecture.

In addition, some of the layers 306 and 308 may include parameters (e.g., weights and/or biases)—such as the feature extractor layer(s) 306 and/or the mapping layer(s) 308—while others may not, such as the ReLU layers and pooling layers, for example. In some examples, the parameters may be learned by the neural network(s) 302 during training. Further, some of the layers 306 and 308 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, an output 310 (which may include, and/or represent, the map data 110) of the neural network(s) 302 may represent one or more maps and/or other output representations (e.g., confidence vectors, regressed outputs, bounding shape outputs, segmentation masks, occupancy or height grids, etc.). For instance, and as described herein, the output 310 may include, but is not limited to, a height map(s), an occupancy map(s), a height/occupancy map(s), a distance map(s), and/or the like.

Figure 3B:
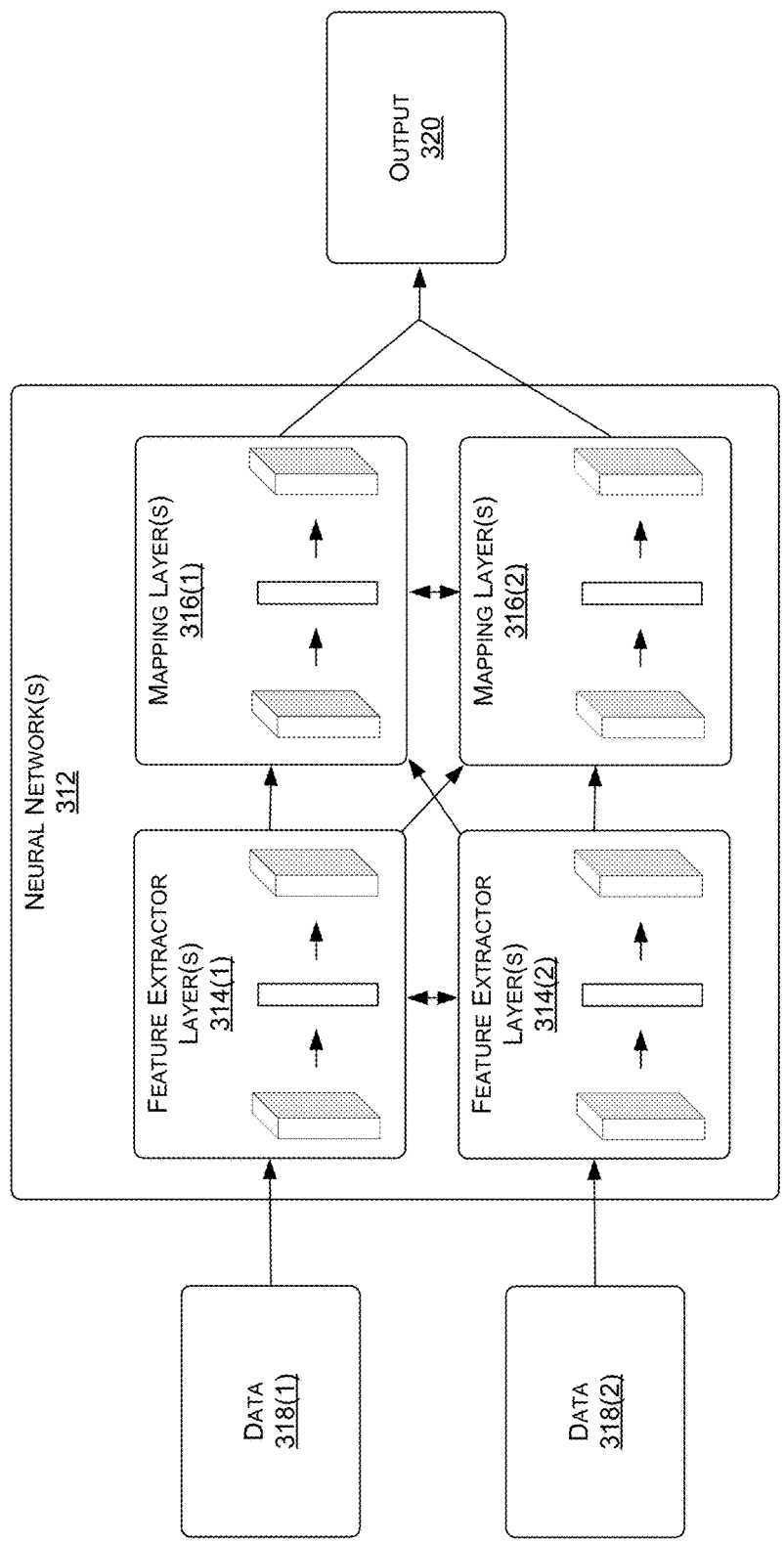

FIG. 3B illustrates another example of a neural network(s) 312 (which may represent, and/or include, the neural network(s) 108), in accordance with some embodiments of the present disclosure. As shown, the neural network(s) 312 may include a first feature extractor layer(s) 314(1) and/or a first mapping layer(s) 316(1) associated with a first type of data 318(1) and a second feature extractor layer(s) 314(2) and/or a second mapping layer(s) 316(2) associated with a second type of data 318(2). For instance, the first data 318(1) may include sensor data 102 and/or input data 106 associated with a first type of sensor and the second data 318(2) may include sensor data 102 and/or input data 106 associated with a second, different type of sensor. While the example of FIG. 3B illustrates the neural network(s) 312 as including feature extractor layer(s) 314(1)-(2) and mapping layer(s) 316(1)-(2) associated with two types of data 318(1)-(2), in other examples, the neural network(s) 312 may include any number of feature extractor layer(s) 314(1)-(2) and/or any number of mapping layer(s) 316(1)-(2) associated with any number of different types of data 318(1)-(2). Additionally, in some examples, at least some of the feature extractor layer(s) 314(1) may be combined with at least some of the feature extractor layer(s) 314(2) and/or at least some of the mapping layer(s) 316(1) may be combined with at least some of the mapping layer(s) 316(2).

In the example of FIG. 3B, the first feature extractor layer(s) 314(1) and the first mapping layer(s) 316(1) may respectively be similar to the feature extractor layer(s) 306 and the mapping layer(s) 308 except that the first feature extractor layer(s) 314(1) and the first mapping layer(s) 316(1) process the first type of data 318(1). Additionally, the second feature extractor layer(s) 314(2) and the second mapping layer(s) 316(2) may respectively be similar to the feature extractor layer(s) 306 and the mapping layer(s) 308 except that the second feature extractor layer(s) 314(2) and the second mapping layer(s) 316(2) process the second type of data 318(2). Additionally, the output from the first feature extractor layer(s) 314(1) may be provided to the second feature extractor layer(s) 314(2), the first mapping layer(s) 316(1), and/or the second mapping layer(s) 316(2). Furthermore, the output from the second feature extractor layer(s) 314(2) may be provided to the first feature extractor layer(s) 314(1), the first mapping layer(s) 316(1), and/or the second mapping layer(s) 316(2).

An output 320 (which may include, and/or represent, the map data 110) of the neural network(s) 312 may represent one or more maps. For instance, and as described herein, the output 320 may include, but is not limited to, a height map(s), an occupancy map(s), a height/occupancy map(s), a distance map(s), and/or the like.

Figure 3C:
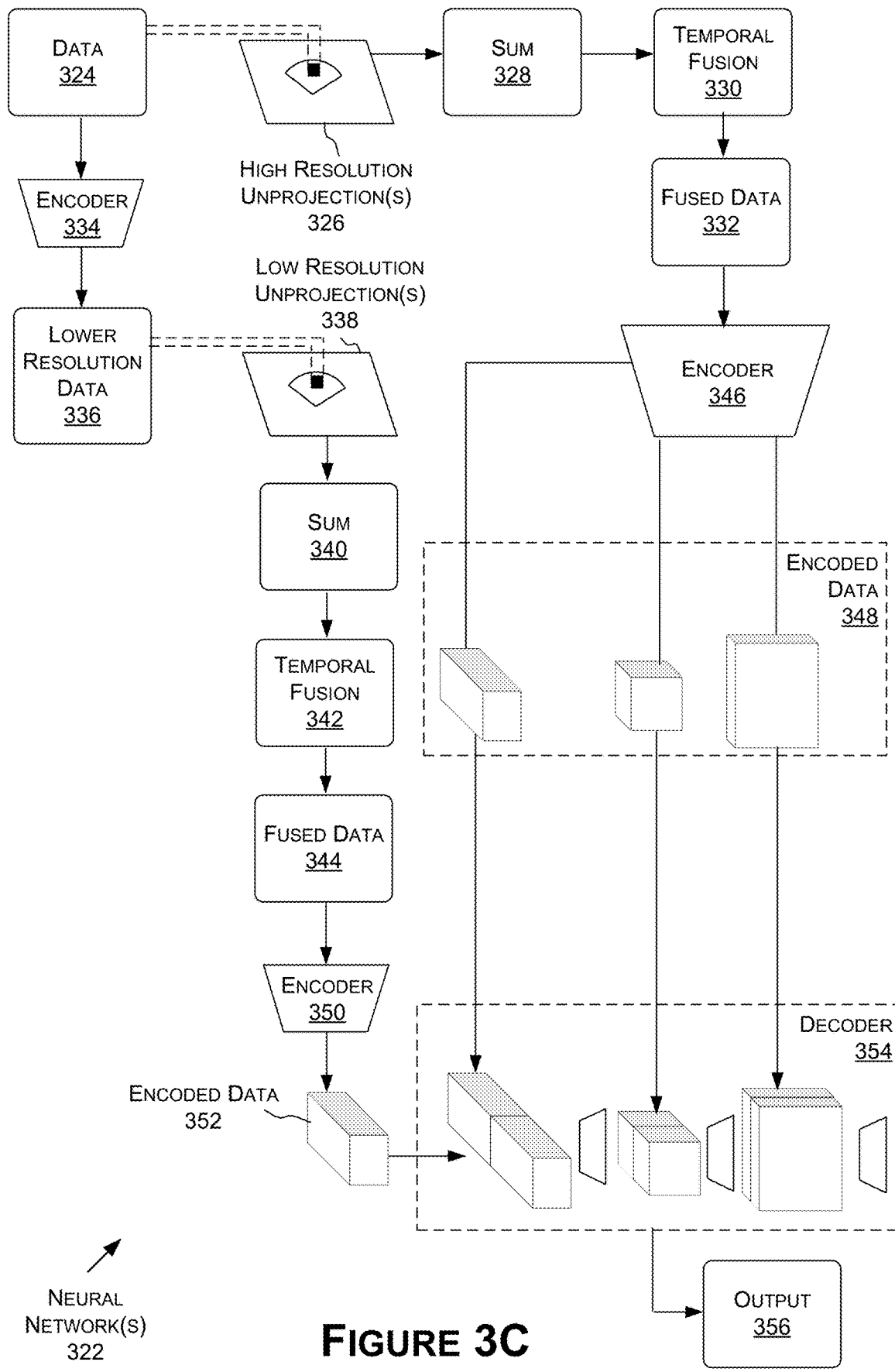

FIG. 3C illustrates an example of a neural network(s) 322 that uses temporal fusion to generate one or more maps and/or other types of outputs 356, in accordance with some examples of the present disclosure. As shown, the neural network(s) 322 may receive data 324 as an input. The data 324 may include the sensor data 102(1), the sensor data 102(2), the sensor data 102(3), the input data 106(1), the input data 106(2), and/or the input data 106(3). In some examples, the data 324 is associated with a single type of sensor. For instance, the data 324 may include sensor data 102 generated using one or more sensors that include the same type of sensor and/or input data 106 generated using the sensor data 102. In some examples, the data 324 is associated with more than one type of sensor. For instance, the data 324 may include sensor data 102 generated using multiple sensors that include different types of sensors and/or input data 106 generated using the sensor data 102.

As shown, the neural network(s) 322 may generate a high resolution unprojection(s) 326. In some examples, the high resolution unprojection(s) 326 may include a map(s), an image(s), and/or the like that indicates the possible location(s) of object(s) within the environment. For instance, the high resolution unprojection(s) 326 may be generated using one or more of the processes described with respect to FIGS. 2A-2B. For instance, in some examples, the high resolution unprojection(s) 326 may be generated using the input data 218 from FIG. 2B to generate an image indicating the location(s) of object(s), similar to the example of FIG. 2A (e.g., using the opposite processes as described in FIGS. 2A-2B). In some examples, the high resolution unprojection(s) 326 may include the input data 218 from FIG. 2B. In either of the examples, the high resolution unprojection(s) may include a first resolution such as, but not limited to, 512×512, 1920×1080, 3840,2160, and/or any other resolution.

The neural network(s) 322 may then sum 328 up the high resolution unprojection(s) 326. For instance, if the neural network(s) 322 generates more than one high resolution unprojection(s) 326 for a single instance in time (e.g., two high resolution unprojection(s) 326, ten high resolution unprojection(s) 326, fifty high resolution unprojection(s) 326, etc.), then the neural network(s) 322 may sum 328 up the high resolution unprojection(s) 326 to generate a combined high resolution unprojection.

The neural network(s) 322 may then perform temporal fusion 330 using the high resolution unprojections 326 generated at different instances in time in order to generate fused data 332. For instance, the vehicle may be generating the data 324 as the vehicle is navigating through an environment. As such, a first high resolution unprojection(s) 326 generated using data 324 associated with a first instance in time may represent a different portion of the environment as a second high resolution unprojection(s) 326 generated using data 324 associated with a second, subsequent instance in time. As such, the neural network(s) 322 may perform temporal fusion 330 to align the first high resolution unprojection(s) 326 associated with the first instance in time with the second high resolution unprojection(s) 326 associated with the second instance in time. In some examples, the neural network(s) 322 performs the alignment using data representing motion of the vehicle or machine (e.g., ego-motion) between the first instance in time and the second instance in time (and/or any other number of instances of time).

For instance, the neural network(s) 322 may use the data to determine a lateral motion, a longitudinal motion, an orientation motion (e.g., a change in orientation), and/or the like between the first instance in time and the second instance in time. The neural network(s) 322 may then use the lateral motion, the longitudinal motion, the orientation motion, and/or the like to transform the first high resolution unprojection(s) 326 associated with the first instance in time to the second high resolution unprojection(s) 326 associated with the second instance in time, or vice versa. For instance, if the center of the first high resolution unprojection(s) 326 represents the location (e.g., an origin located on a vehicle, such as on a center of a rear axle of the vehicle, or at another location) of the vehicle in the environment, then the neural network(s) 322 may transform the first high resolution unprojection(s) 326 associated with the first instance in time by moving the center of the first high resolution unprojection(s) 326 based on the lateral and/or longitudinal motion and/or change the orientation of the first high resolution unprojection(s) 326 based on the orientation motion. The neural network(s) 322 may then fuse the first high resolution unprojection(s) 326 associated with the first instance in time with the second high resolution unprojection(s) 326 associated with the second instance in time to generate the fused data 332.

As further illustrated in the example of FIG. 3C, the neural network(s) 322 may include an encoder 334 that encodes the data 324 in order to generate lower resolution data 336. The neural network(s) 322 may then generate a low resolution unprojection(s) 338 using the lower resolution data 336. In some examples, the low resolution unprojection(s) 338 may include a map(s), an image(s), and/or the like that indicates the possible location(s) of object(s) within the environment (e.g., similar to the high resolution unprojection(s) 326). For instance, the low resolution unprojection(s) 338 may be generated using one or more of the processes described with respect to FIGS. 2A-2B. The low resolution unprojection(s) 338 may include a second resolution that is less than the first resolution such as, but not limited to, 128×128.

The neural network(s) 322 may then sum 340 up the low resolution unprojection(s) 338. For instance, if the neural network(s) 322 generates more than one low resolution unprojection(s) 338 for a single instance in time (e.g., two low resolution unprojection(s) 338, ten low resolution unprojection(s) 338, fifty low resolution unprojection(s) 338, etc.), then the neural network(s) 322 may sum 340 up the low resolution unprojection(s) 338 to generate a combined low resolution unprojection.

The neural network(s) 322 may then perform temporal fusion 342 using the low resolution unprojections 338 generated at different instances in time in order to generate fused data 344. For instance, and as described herein, the vehicle may be generating the data 324 as the vehicle is navigating through an environment. As such, a first low resolution unprojection(s) 338 generated using data 324 associated with a first instance in time may represent a different portion of the environment as a second low resolution unprojection(s) 338 generated using data 324 associated with a second, subsequent instance in time. As such, the neural network(s) 322 may perform temporal fusion 342, using one or more of similar processes as the temporal fusion 330, to align the first low resolution unprojection(s) 338 associated with the first instance in time to the second low resolution unprojection(s) 338 associated with the second instance in time. The neural network(s) 322 may then fuse the first low resolution unprojection(s) 338 associated with the first instance in time with the second low resolution unprojection(s) 338 associated with the second instance in time to generate the fused data 344.

The neural network(s) 322 may then use an encoder 346 to encode the fused data 332 in order to generated encoded data 348. In some examples, the encoded data 348 is generated using one or more layers of the encoder 346. For instance, the encoded data 348 may be generated using connected layer of the encoder 346, skipped layers of the encoder 346, and/or the like. The neural network(s) 322 may also use an encoder 350 to encode the fused data 344 in order to generate encoded data 352.

The neural network(s) 322 may then use a decoder 354 to decode the encoded data 348 with the encoded data 352 in order to generate output 356. In the example of FIG. 3C, the decoder 354 may decode the encoded data 348 with the encoded data 352 using one or more layers. For instance, a first portion of the encoded data 348 may be combined with a first portion of the encoded data 352 and applied to a first layer of the decoder 354, a second portion of the encoded data 348 may be combined with a second portion of the encoded data 352 and applied to a second layer of the decoder 354, and a third portion of the encoded data 348 may be combined with a third portion of the encoded data 352 and applied to a third layer of the decoder 354. While this is just one example technique for the decoder 354 decoding the encoded data 348 with the encoded data 352, in other examples, the decoder 354 may use one or more additional and/or alternative techniques to decode the encoded data 348 with the encoded data 352.

The output 356 (which may include, and/or represent, the map data 110) of the neural network(s) 322 may represent one or more maps and/or other output representations, such as, but not limited to, those described herein. For instance, and as described herein, the output 356 may include, but is not limited to, a height map(s), an occupancy map(s), a height/occupancy map(s), a distance map(s), and/or the like.

Referring back to the example of FIG. 1, the neural network(s) 108 may generate the map data 110. In some examples, the map data 110 may represent a height map, such as a BEV height map and/or a top-down height map, indicating the heights of the environment surrounding the vehicle. Additionally, or alternatively, in some examples, the map data 110 may represent an occupancy map, such as a BEV occupancy map and/or a top-down occupancy map, indicating areas of the environment that are occupied (e.g., by another object(s)) and areas of the environment that are not occupied (e.g., free to navigate). Additionally, or alternatively, in some examples, the map data 110 may represent a height/occupancy map, such as a BEV height/occupancy map and/or a top-down height/occupancy map, indicating both the heights of the environment surrounding the vehicle and the occupancies.

Figure 4A:
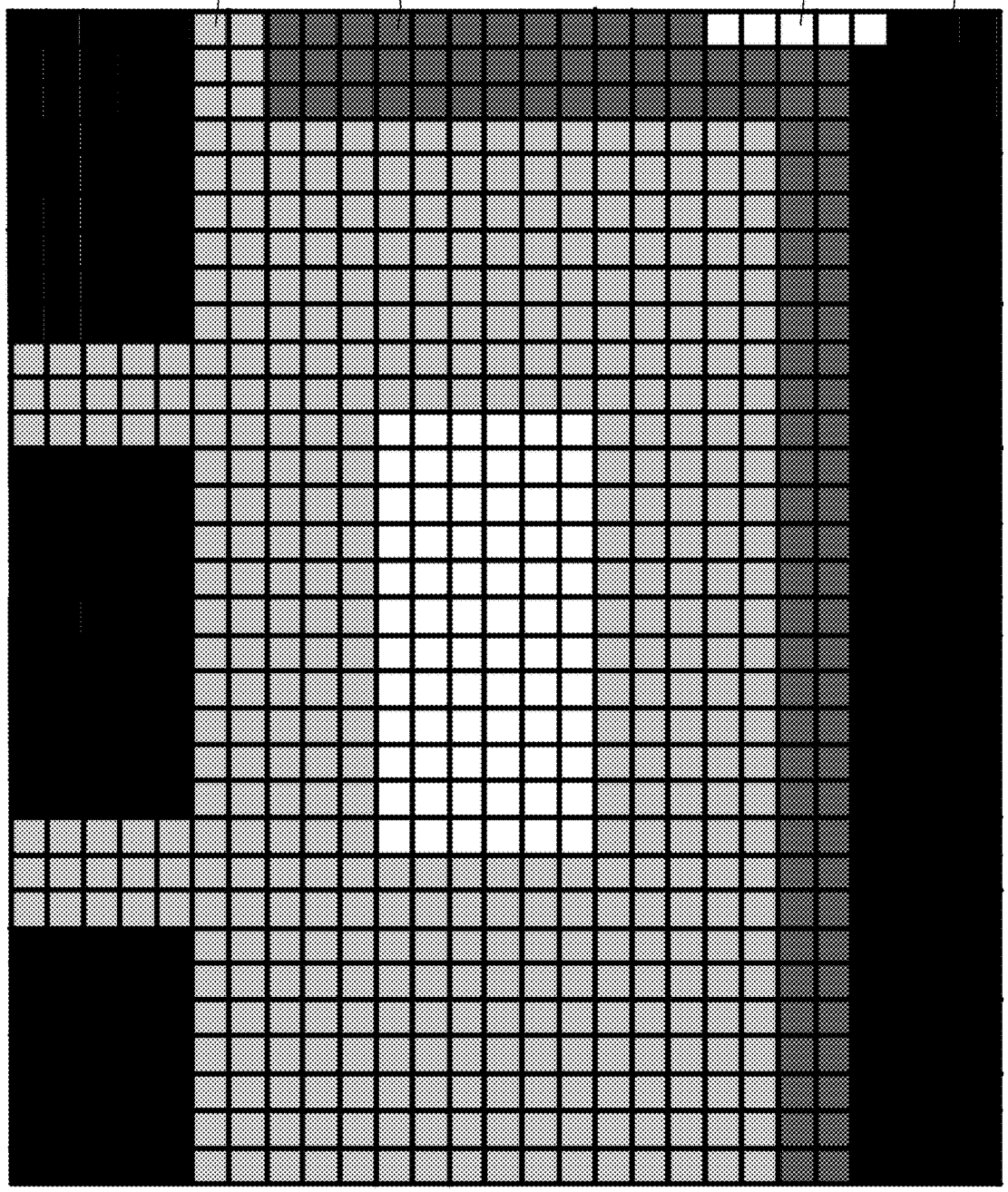
FIGS. 4A-4C illustrate example maps generated by a neural network(s), in accordance with some embodiments of the present disclosure.

For instance, FIG. 4A illustrates an example of a height map 402, in accordance with some examples of the present disclosure. As shown, the height map 402 may include various indicators 404(1)-(4) (also referred to singularly as "indicator 404" or in plural as "indicators 404") (although only one area is labeled for each type of indicator 404 for clarity reasons) that indicate the various heights of the environment surrounding the vehicle and/or areas within the environment for which the vehicle is uncertain of the height. While the example of FIG. 4A illustrates the height map 402 as including four different colors of indicators 404, in other examples, the height map 402 may include any number of colors of indicators 404. Additionally, while the example of FIG. 4A illustrates using colors for the indicators 404, in other examples, the height map 402 may use other types of indicators 404, such as shading, patterns, shapes, and/or the like.

In the example of FIG. 4A, the first indicators 404(1) of the height map 402 may indicate areas of the environment for which the vehicle is uncertain of the height. For instance, and as shown, the vehicle may be uncertain about the center of the height map 402 since the center of the height map 402 represents the location of the vehicle. As such, the sensor(s) of the vehicle may be less capable of generating sensor data representing that area of the environment and/or the neural network(s) 108 may generate the height map 402 to automatically cause that area to include an uncertain height. The vehicle may also be uncertain about other areas of the environment for which the sensor data 102 does not represent (e.g., the areas may be blocked by other objects). The second indicators 404(2) of the height map 402 may then indicate areas of the environment that include a first height, the third indicators 404(3) of the height map 402 may indicate areas of the environment that include a second height that is greater than the first height, and the fourth indicator 404(4) of the height map 402 may indicate areas of the environment that include a third height that is greater than the second height.

In the example of FIG. 4A, each square of the height map 402 may include a pixel or point representing an area of the environment. For example, the height map 402 may indicate the respective height of one or more pixels or points (e.g., each pixel or point). However, in other examples, each square of the height map 402 may include multiple pixels or points (e.g., points—x, y coordinates—in 3D space) representing an area of the environment. Additionally, in some examples, the height map 402 may include confidences associated with the heights. For example, and for a pixel or point, the height map 402 may indicate both the height associated with the pixel or point and the confidence associated with the height. For example, the height and/or confidence may be encoded to the pixel values for the pixels or points, and the location of the pixels or points may indicate lateral and longitudinal locations in 3D space, so the resulting map or grid represents 3D information about the environment.

Figure 4B:
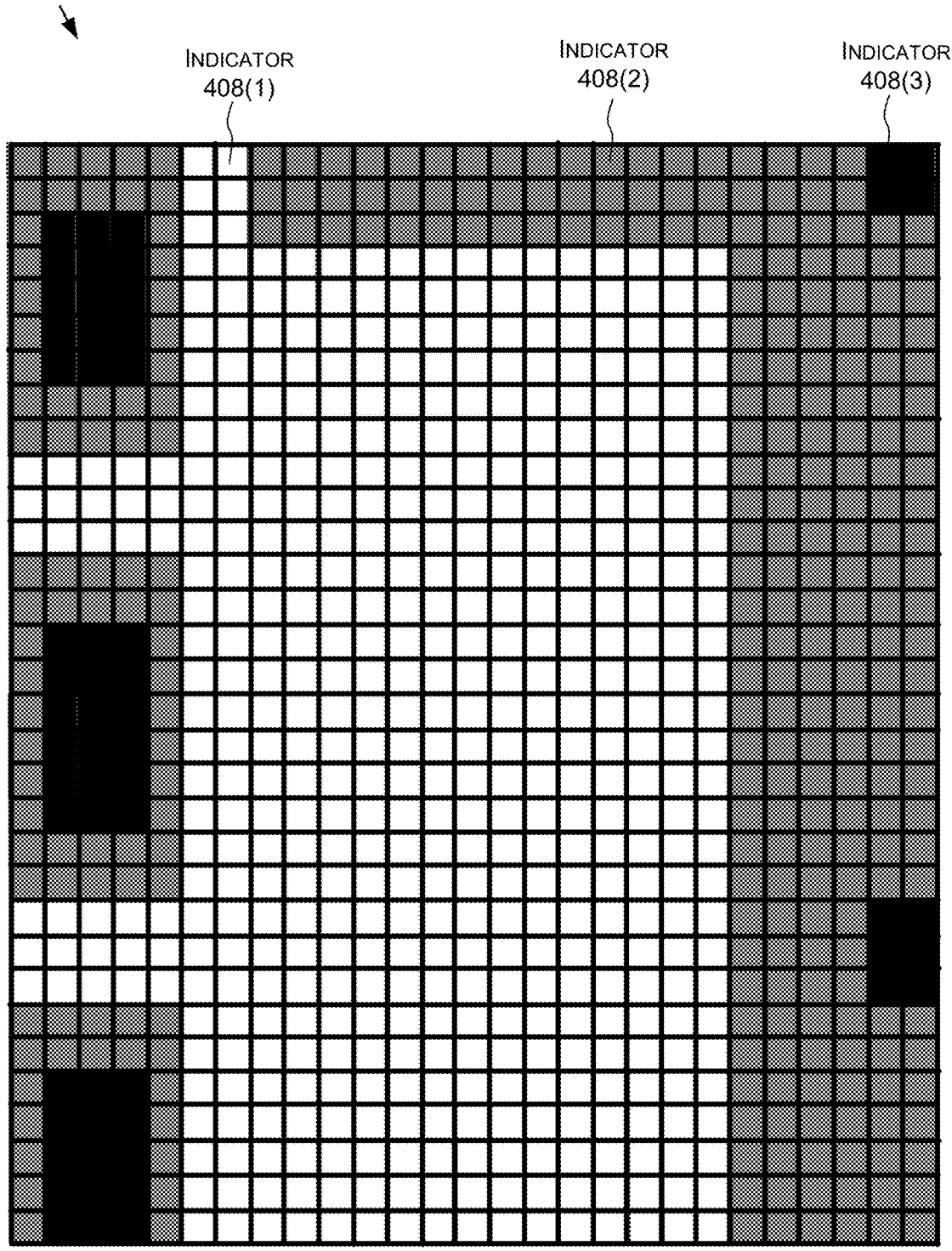

FIG. 4B illustrates an example of an occupancy map 406, in accordance with some examples of the present disclosure. As shown, the occupancy map 406 may include various indicators 408(1)-(3) (also referred to singularly as "indicator 408" or in plural as "indicators 408") (although only one area is labeled for each type of indicator 408 for clarity reasons) that indicate the various occupancies associated with the environment surrounding the vehicle and/or areas within the environment for which the vehicle is uncertain of the occupancy. While the example of FIG. 4B illustrates the occupancy map 406 as including three different colors of indicators 408, in other examples, the occupancy map 406 may include any number of colors of indicators 408. Additionally, while the example of FIG. 4B illustrates using colors for the indicators 408, in other examples, the occupancy map 406 may use other types of indicators 408, such as shading, patterns, shapes, and/or the like.

In the example of FIG. 4B, the first indicator 408(1) of the occupancy map 406 may indicate areas of the environment that are not occupied (e.g., areas of the environment for which the vehicle is free to navigate). The second indicator 408(2) of the occupancy map 406 may indicate areas of the environment that are occupied (e.g., areas of the environment for which the vehicle may not navigate). Additionally, the third indicator 408(3) of the occupancy map 406 may indicate areas of the environment for which the vehicle is uncertain about the occupancy.

In the example of FIG. 4B, each square of the occupancy map 406 may include a pixel representing an area of the environment. For example, the occupancy map 406 may indicate the respective occupancy associated with one or more pixels (e.g., each pixel). However, in other examples, each square of the occupancy map 406 may include multiple pixels representing an area of the environment. Additionally, in some examples, the occupancy map 406 may include confidences associated with the occupancies. For example, and for a pixel, the occupancy map 406 may indicate both the occupancy associated with the pixel and the confidence associated with the occupancy.

In the example of FIGS. 4B, the occupancy map 406 may correspond to the height map 402. For example, the areas of the height map 402 that include heights less than a threshold height and/or areas of the height map 402 that are associated with the location of the vehicle may correspond to the unoccupied areas of the occupancy map 406. For instance, the areas of the height map 402 that include the second indicator 404(2) may include heights that are less than the threshold height. Additionally, areas of the height map 402 that include heights that are equal to or greater than the threshold height may correspond to the occupied areas of the occupancy map 406. For instance, areas of the height map 402 that include the third indicator 404(3) and the fourth indicator 404(4) may include heights that are equal to or greater than the threshold height.

Figure 4C:
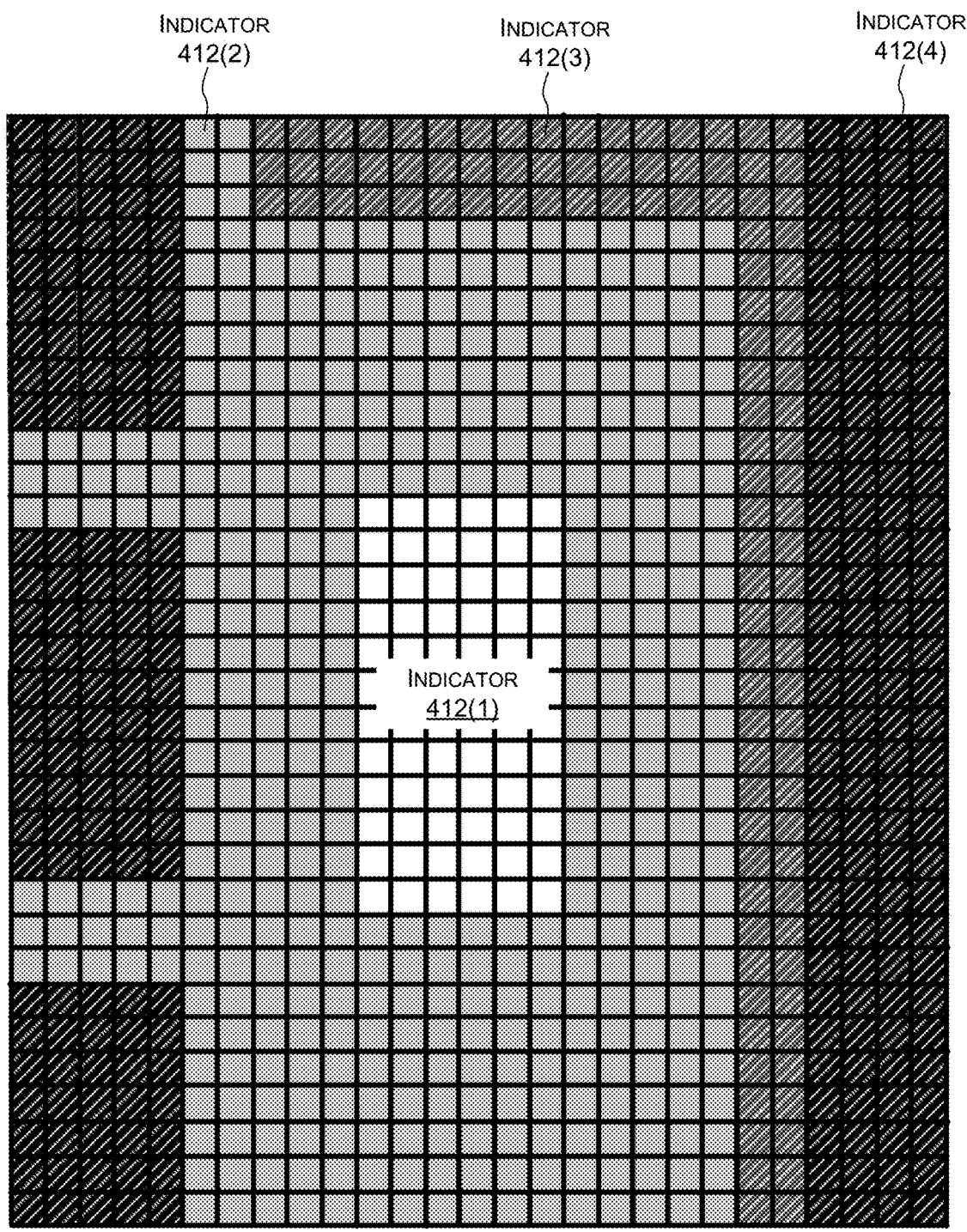

For instance, FIG. 4C illustrates an example of a height/occupancy map 410, in accordance with some examples of the present disclosure. As shown, the height/occupancy map 410 may include various indicators 412(1)-(4) (also referred to singularly as "indicator 412" or in plural as "indicators 412") (although only one area is labeled for each type of indicator 412 for clarity reasons) that indicate the various heights and/or occupancies of the environment surrounding the vehicle. While the example of FIG. 4C illustrates the height/occupancy map 410 as including four different of indicators 412, in other examples, the height/occupancy map 410 may include any number indicators 410. Additionally, while the example of FIG. 4B illustrates using colors and patterns for the indicators 410, in other examples, the height/occupancy map 410 may use other types of indicators 410.

In the example of FIG. 4C, the first indicators 412(1) of the height/occupancy map 410 may indicate areas of the environment for which the vehicle is uncertain of the height. For instance, and as shown, the vehicle may be uncertain about the center of the height/occupancy map 410 since the center of the height/occupancy map 410 represents the location of the vehicle. As such, the sensor(s) of the vehicle may be unable to generate sensor data representing that area of the environment and/or the neural network(s) 108 may generate the height/occupancy map 410 to automatically cause that area to include an uncertain height. The vehicle may also be uncertain about other areas of the environment for which the sensor data 102 does not represent (e.g., the areas may be blocked by other objects). The second indicators 412(2) of the height/occupancy map 410 may then indicate areas of the environment that include a first height, the third indicators 412(3) of the height/occupancy map 410 may indicate areas of the environment that include a second height that is greater than the first height, and the fourth indicator 412(4) of the height/occupancy map 410 may indicate areas of the environment that include a third height that is greater than the second height.

The indicators 412 of the height/occupancy map 410 may further indicate whether the areas of the environment are occupied or unoccupied. For instance, and as shown, the indicators 412(1)-(2) that include a first pattern (e.g., a solid pattern) may be unoccupied while the indicators 412(3)-(4) that include a second patter (e.g., a stripped pattern) may be occupied. As such, the height/occupancy map 412 indicates both the heights and the occupancies associated with the environment. As such, the height/occupancy map 410 indicates the same information from both the height map 402 and the occupancy map 406.

Referring back to the example of FIG. 1, in some examples, the process 100 may include a mapping component 112 that generates additional map data 114 using the map data 110. For a first example, if the map data 110 represents a height map, then the mapping component 112 may use the height map to generate additional map data 114 representing an occupancy map. In some examples, to generate the occupancy map, the mapping component 112 may determine that areas of the height map that are associated with heights that are less than a threshold height are unoccupied and areas of the environment of the height map that are associated with heights that are equal to or greater than the threshold height are occupied. The mapping component 112 may then use at least these determinations (and, in some examples, determinations about uncertain areas) to generate the occupancy map.

In some examples, to generate the occupancy map, the mapping component 112 may use more than one threshold. For instance, the mapping component 112 may determine that areas of the height map that are associated with heights that less than a first threshold height are unoccupied, areas of the height map that are associated with heights that are between the first threshold height and a second threshold height may be unoccupied, and areas of the height map that are associated with heights that area greater than the second threshold height are occupied. The mapping component 112 may then use at least these determinations (and, in some examples, determinations about uncertain areas) to generate the occupancy map. While these are just a couple example techniques for how the mapping component 112 may identify the unoccupied and occupied areas of the environment, in other examples, the mapping component 112 may use additional and/or alternative techniques.

For a second example, the mapping component 112 may use the map data 110, which may represent a height map, an occupancy map, and/or a height/occupancy map, to generate additional map data 114 representing a distance map. In some examples, such as when the map data 110 represents a height map, the mapping component 112 may use the heights to determine the locations of objects within the environment. For instance, the mapping component 112 may determine that an object is located at an area where the height changes and/or changes by a threshold amount. The mapping component 112 may then determine the distances to the various objects and generate the distance map indicating these distances and the locations of the objects. In some examples, such as when the map data 110 represents an occupancy map, the mapping component 112 may use the occupancies to determine the locations of objects within the environment. For instance, the mapping component 112 may determine that an object is located at an area that is occupied. The mapping component 112 may then determine the distances to the various objects and generate the distance map indicating these distances and the locations of the objects.

For a third example, the mapping component 112 may process the map data 110 using one or more techniques in order to correct an error(s) with one or more of the maps. For instance, in some examples, the mapping component 112 may process the height map in order to ensure that the areas of the height map (e.g., the pixels of the height map) that represent the location of the vehicle include do not include a height (e.g., an uncertain height). In some examples, the mapping component 112 may process the occupancy map to ensure that the areas of the occupancy map (e.g., the pixels of the occupancy map) that represent the vehicle include unoccupied areas. Still, in some examples, the mapping component 112 may process the map data 110 using one or more smoothing techniques in order to generate the additional map data 114.

Figure 5:
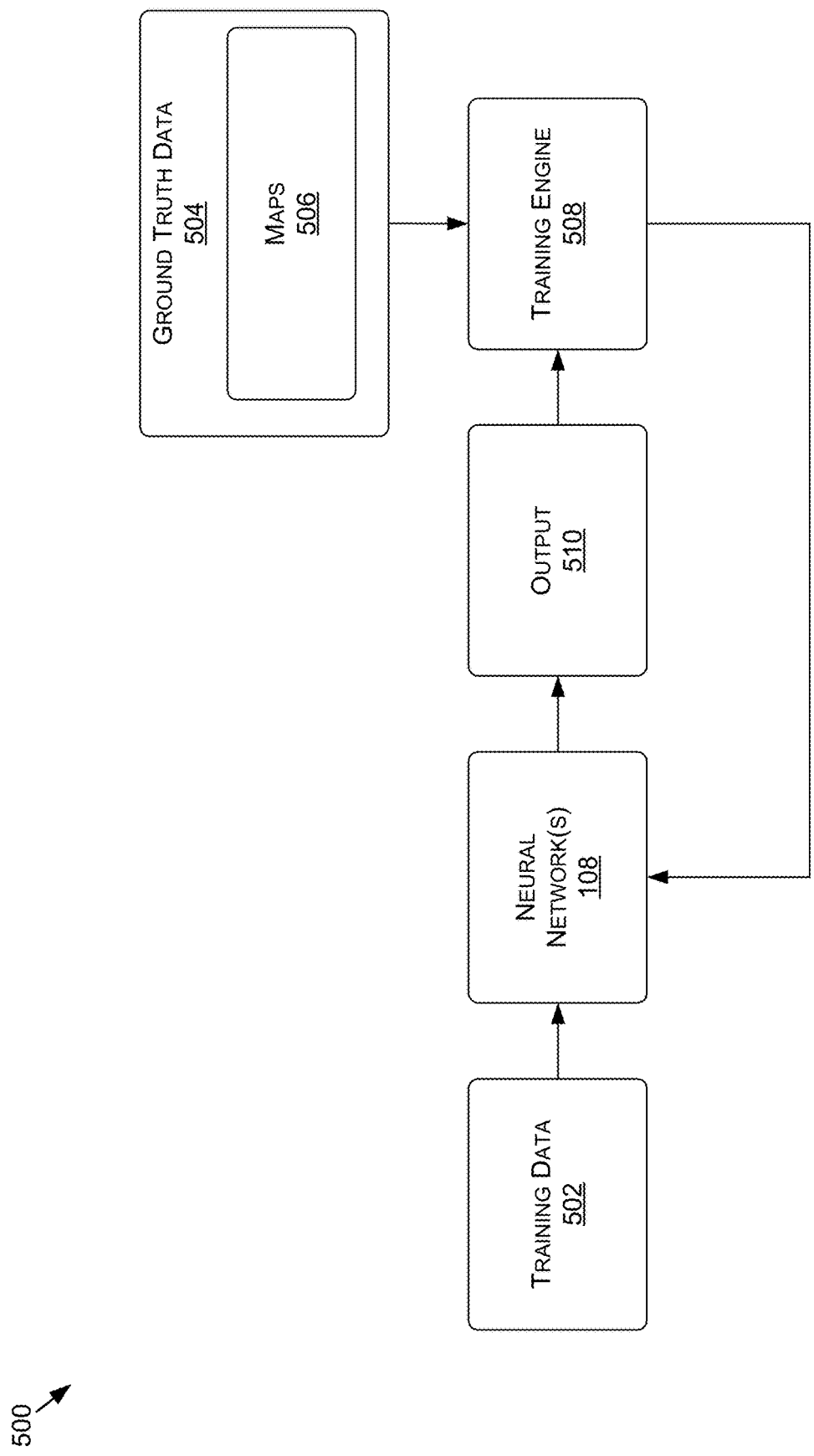
FIG. 5 is a data flow diagram illustrating a process for training a neural network(s) for generating a map(s) and/or other output representation, in accordance with some embodiments of the present disclosure.

Now referring to FIG. 5, FIG. 5 is a data flow diagram illustrating a process 500 for training the neural network(s) 108 (and/or the neural network(s) 302, the neural network(s) 312, or the neural network(s) 322) to generate the map data 110, in accordance with some embodiments of the present disclosure. As shown, the neural network(s) 108 may be trained using training data 502. The training data 502 may be similar to the sensor data 102 and/or the input data 106 that the neural network(s) 108 is being trained to process in order to generate the map data 110. For a first example, if the neural network(s) 108 is being trained to process sensor data 102 and/or input data 106 associated with a single type of sensor in order to generate the map data 110, then the training data 502 may include the sensor data 102 and/or the input data 106 associated with that type of sensor. For a second example, if the neural network(s) 108 is being trained to process sensor data 102 and/or input data 106 associated with multiple types of sensors in order to generate the map data 110, then the training data 502 may include the sensor data 102 and/or the input data 106 associated with the multiple types of sensors.

The neural network(s) 108 may be trained using the training data 502 and ground truth data 504. The ground truth data 504 may include maps, annotations, labels, masks, and/or any other type of ground truth data. For instance, in some embodiments, the ground truth data 504 may represent maps 506 corresponding to the types of maps and/or other output representations for which the neural network(s) 108 is being trained to output. For a first example, if the neural network(s) 108 is being trained to generate height maps, then the maps 506 may include height maps. For a second example, if the neural network(s) 108 is being trained to generate occupancy maps, then the maps 506 may include occupancy maps. For a third example, if the neural network(s) 108 is being trained to generate height maps and occupancy maps, then the maps 506 may include both occupancy maps and height maps. Still, for a fourth example, if the neural network(s) 108 is being trained to generate height/occupancy maps, then the maps 506 may include height/occupancy maps.

The ground truth data 504 may be generated using one or more techniques. For a first example, the ground truth data 504 may be generated within a drawing program (e.g., an annotation program), a computer aided design (CAD) program, a labeling program, another type of program suitable for generating the ground truth data 504, and/or may be hand drawn, in some examples. In such an example, the ground truth data 504 may be synthetically produced (e.g., generated from computer models or renderings), real produced (e.g., designed and produced from real-world data), machine-automated (e.g., using feature analysis and learning to extract features from data and then generate labels), human annotated (e.g., a labeler, or annotation expert, defines the location of the labels), and/or a combination thereof (e.g., human identifies vertices of polylines, machine generates polygons using polygon rasterizer).

For a second example, the ground truth data 504 may be generated using sensor data 102 generated using one or more sensors of the vehicle. For instance, the ground truth data 504 may be generated using sensor data from a LiDAR sensor(s) since, although generating maps 506 using such sensor data may use a large amount of computing resources, the maps 506 are also very accurate. In such examples, the vehicle that generates the sensor data 102 that is associated with the training data 502 may also be generating the sensor data 102 that is associated with the ground truth data 504. For instance, the vehicle may include a number of LiDAR sensors located around the vehicle, such that the LiDAR sensors generate sensor data 102 representing an entirety of the environment surrounding the vehicle. This sensor data 102 may then be used to generate the maps 506, such as the height maps 506, the occupancy maps 506, the height/occupancy maps 506, and/or the like.

Figure 6:
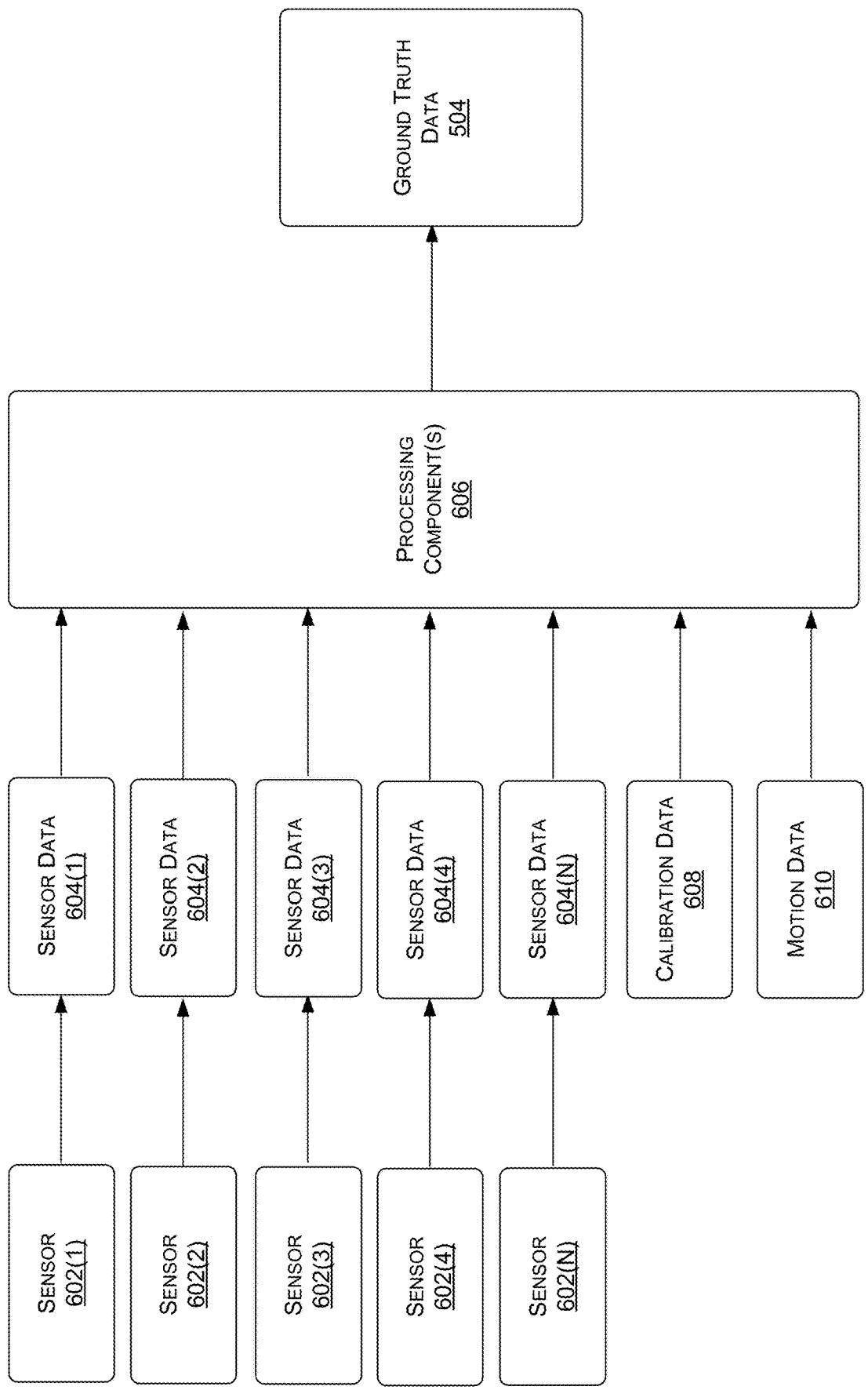
FIG. 6 illustrates an example of generating ground truth data for training a neural network(s) to generate a map(s) and/or other output representation, in accordance with some embodiments of the present disclosure.

For instance, FIG. 6 illustrates an example of generating the ground truth data 504, in accordance with some embodiments of the present disclosure. As shown, the vehicle may include a number of sensors 602(1)-(N) (also referred to singularly as "sensor 602" or in plural as "sensors 602"). For instance, if the sensors 602 include LiDAR sensors 602, then the vehicle may include a LiDAR sensor(s) 602 located at a front of the vehicle, a LiDAR sensor(s) 602 located at a left side of the vehicle, a LiDAR sensor(s) 602 located at a right side of the vehicle, a LiDAR sensor(s) 602 located at a back of the vehicle, a LiDAR sensor(s) 602 located at one or more corners of the vehicle, and/or the like. As shown, the sensors 602 may generate sensor data 604(1)-(N) (also referred to as "sensor data 604"). As described herein, the sensors 602 may be generating the sensor data 604 while the vehicle is also generating the sensor data associated with the training data 502 such that the sensor data 604 and the training data 502 represent the same environment.

A processing component(s) 606 may receive the sensor data 604 generated using the sensors 602 and use the sensor data 604 to generate the ground truth data 504. In some examples, in addition to the sensor data 604, the processing component(s) 606 may receive calibration data 608 associated with the sensors 602. The processing component(s) 606 may then use the calibration data 608 when generating the ground truth data 504. For instance, the calibration data 608 may represent one or more calibration parameters associated with the sensors 602 that the processing component(s) 606 may use to align sensor data 604 from the different sensors 602 together. In some examples, in addition to the sensor data 604, the processing component(s) 606 may further receive motion data 610 representing a motion of the vehicle while generating the sensor data 604. The processing component(s) 606 may then use the motion data 610 when generating the ground truth data 504. For instance, the processing component(s) 606 may use the motion data 610 to temporally align the sensor data 604 over a period of time.

The processing component(s) 606 may use the sensor data 604, the calibration data 608, and/or the motion data 610 to generate the maps 506 associated with the ground truth data 504. In some examples, the processing component(s) 606 generates a map by initially generating multiple maps representing various views around the vehicle and then combining (e.g., fusing) the maps. For instance, the processing component(s) 606 may generate a first map representing the environment located in front of the vehicle (e.g., a front height map, a front occupancy map, etc.), a second map representing the environment located to a left of the vehicle (e.g., a left height map, a left occupancy map, etc.), a third map representing the environment located behind the vehicle (e.g., a back height map, a back occupancy map, etc.), a fourth map representing the environment located to a right of the vehicle (e.g., a right height map, a right occupancy map, etc.), and/or so forth. The processing component(s) 606 may then generate a map 506 for the ground truth data 504 by combining the maps.

Referring back to the example of FIG. 5, a training engine 508 may use one or more loss functions that measure loss (e.g., error) in outputs 510 generated using the neural network(s) 108 as compared to the ground truth data 504. Any type of loss function may be used, such as cross entropy loss, mean squared error, mean absolute error, mean bias error, and/or other loss function types. In some embodiments, different outputs 510 may have different loss functions. For example, outputs 510 representing a first type of map, such as height maps, may have a first loss function while outputs 510 representing a second type of map, such as occupancy maps, may have a second loss function. In such examples, the loss functions may be combined to form a total loss, and the total loss may be used to train (e.g., update the parameters of) the neural network(s) 108. In any example, backward pass computations may be performed to recursively compute gradients of the loss function(s) with respect to training parameters. In some examples, weight and biases of the neural network(s) 108 may be used to compute these gradients.

Figure 7:
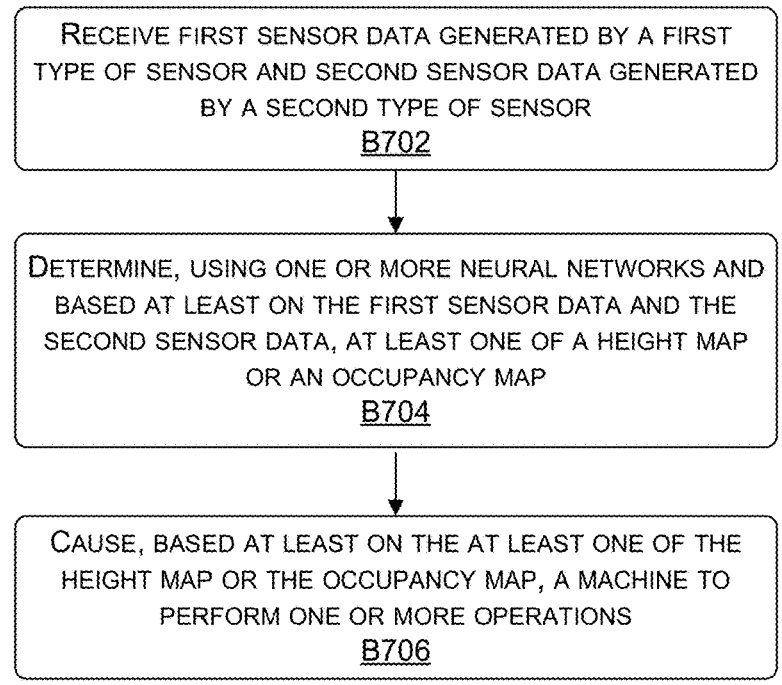
FIG. 7 is a flow diagram showing a method for generating a map and/or other output representation using sensor data generated using multiple types of sensors, in accordance with some embodiments of the present disclosure.
Figure 8:
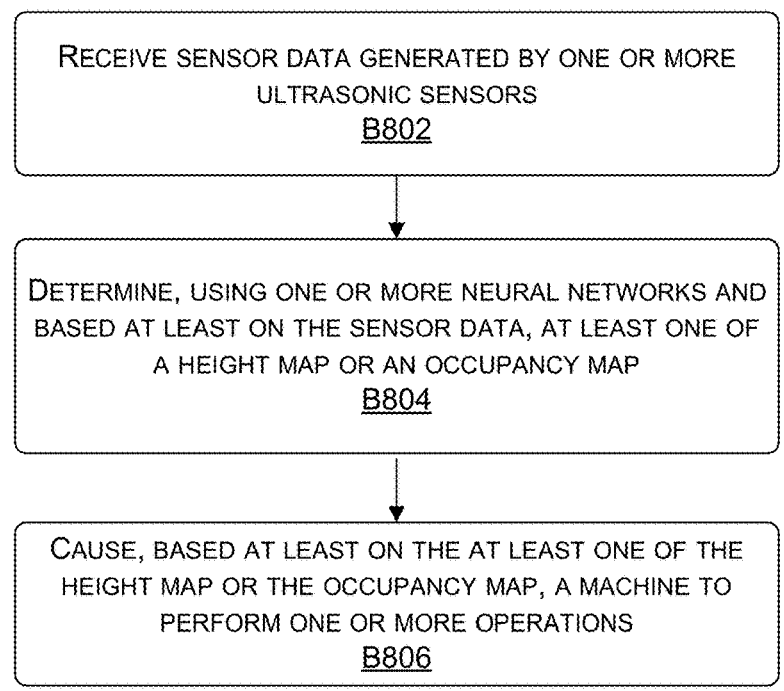
FIG. 8 is a flow diagram showing a method for generating a map and/or other output representation using sensor data generated using one or more ultrasonic sensors, in accordance with some embodiments of the present disclosure.

Now referring to FIGS. 7-8, each block of methods 700 and 800, described herein, comprises a computing process that may be performed using any combination of hardware, firmware, and/or software. For instance, various functions may be carried out by a processor executing instructions stored in memory. The methods 700 and 800 may also be embodied as computer-usable instructions stored on computer storage media. The methods 700 and 800 may be provided by a standalone application, a service or hosted service (standalone or in combination with another hosted service), or a plug-in to another product, to name a few. In addition, methods 700 and 800 are described, by way of example, with respect to FIG. 1. However, these methods 700 and 800 may additionally or alternatively be executed by any one system, or any combination of systems, including, but not limited to, those described herein.

FIG. 7 is a flow diagram showing a method 700 for generating an output using sensor data generated using multiple types of sensors, in accordance with some embodiments of the present disclosure. The method 700, at block B702, may include receiving first sensor data generated using a first type of sensor and second sensor data generated using a second type of sensor. For instance, the vehicle may include at least a first type of sensor that generates the first sensor data 102(1) and a second type of sensor that generates the second sensor data 102(2). As described herein, the first type of sensor and/or the second type of sensor may include, but are not limited to, image sensor(s), RADAR sensor(s), ultrasonic sensor(s), and/or the like. In some examples, a processing component 104 may process the first sensor data 102(1) and/or the second sensor data 102(2) to generate input data 106. For instance, the processing component 104 may process the first sensor data 102(1) and/or the second sensor data 102(2) such that the first sensor data 102(1) and the second sensor data 102(2) are in the same latent space.

The method 700, at block B704, may include determining, using one or more neural networks and based at least on the first sensor data and the second sensor data, at least one of a height map or an occupancy map. For instance, the first sensor data 102(1) (and/or the first input data 106(1)) and the second sensor data 102(2) (and/or the second input data 106(2)) may be input into the neural network(s) 108. The neural network(s) 108 may be trained to process the first sensor data 102(1) (and/or the first input data 106(1)) and the second sensor data 102(2) (and/or the second input data 106(2)) and, based on the processing, output the map data 110 representing the at least one of the height map or the occupancy map (and/or other output representation). In some examples, the map data 110 may represent the height map and the mapping component 112 may then generate the occupancy map using the height map.

The method 700, at block B706, may include causing, based at least on the at least one of the height map or the occupancy map, a machine to perform one or more operations. For instance, the vehicle may perform the one or more operations based on the at least one of the height map or the occupancy map. In some examples, the one or more operations may include navigating the vehicle in order to avoid colliding with one or more objects located within the environment, and/or to stay within drivable regions of the environment and off of non-drivable space.

FIG. 8 is a flow diagram showing a method 800 for generating a map using sensor data generated using an ultrasonic sensor(s), in accordance with some embodiments of the present disclosure. The method 800, at block B802, may include receiving sensor data generated using one or more ultrasonic sensors. For instance, the vehicle may include one or more ultrasonic sensors that generate the sensor data 102. In some examples, a processing component 104 may process the sensor data 102 in order to generate input data 106. For instance, the sensor data 102 may represent a frequency of a signal(s) associated with bins. The processing component 104 may thus process the sensor data 102 to generate the input data 106 representing the location(s) of object(s) within the environment.

The method 800, at block B804, may include determining, using one or more neural networks and based at least on the sensor data, at least one of a height map or an occupancy map. For instance, the sensor data 102 (and/or the input data 106) may be input into the neural network(s) 108. The neural network(s) 108 may be trained to process the sensor data 102 (and/or the input data 106) and, based on the processing, output the map data 110 representing the at least one of the height map or the occupancy map. In some examples, the map data 110 may represent the height map and the mapping component 112 may then generate the occupancy map using the height map.

The method 800, at block B806, may include causing, based at least on the at least one of the height map or the occupancy map, a machine to perform one or more operations. For instance, the vehicle may perform the one or more operations based on the at least one of the height map or the occupancy map. In some examples, the one or more operations may include navigating the vehicle in order to avoid colliding with one or more objects located within the environment.

Example Autonomous Vehicle

Figure 9A:
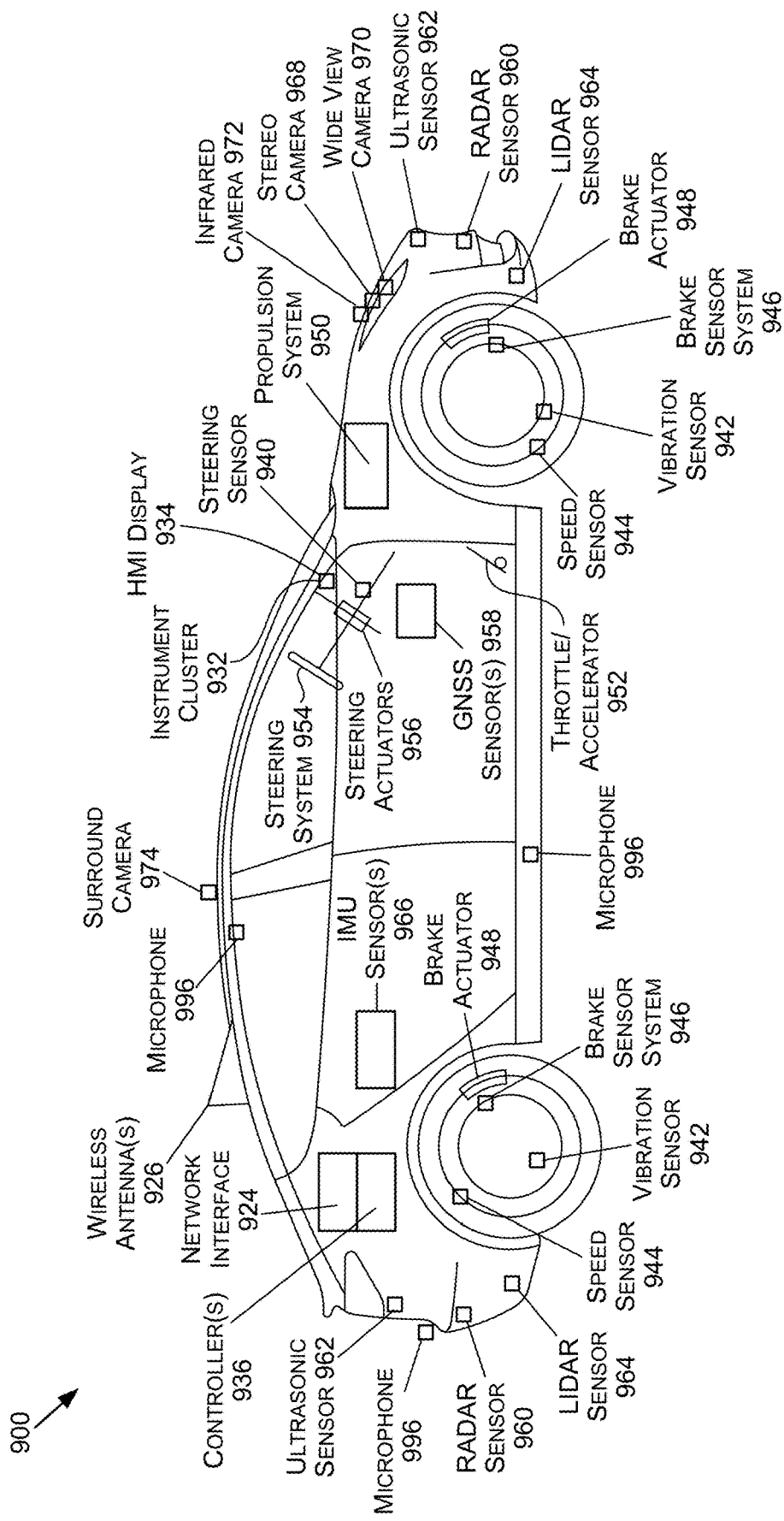
FIG. 9A is an illustration of an example autonomous or semi-autonomous vehicle or machine, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LiDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
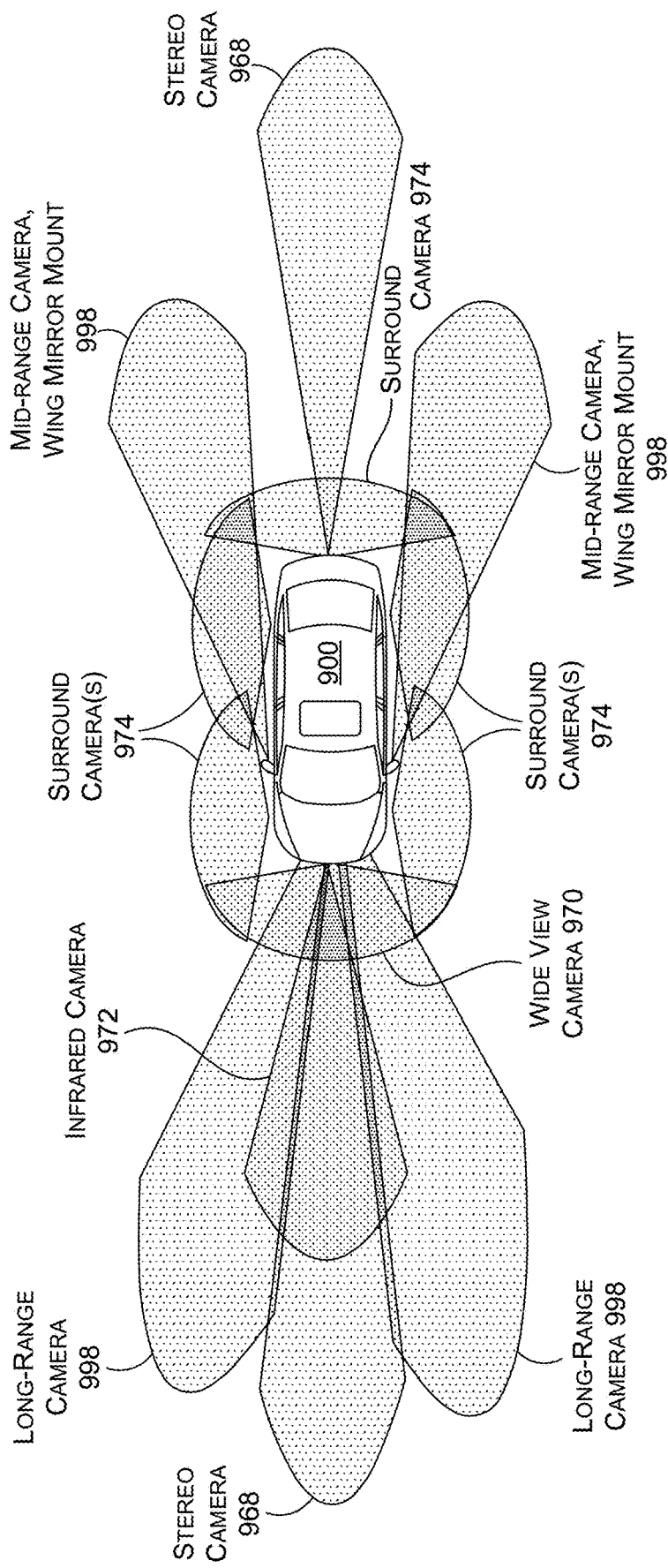
FIG. 9B is an example of camera locations and fields of view for the example autonomous or semi-autonomous vehicle or machine of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
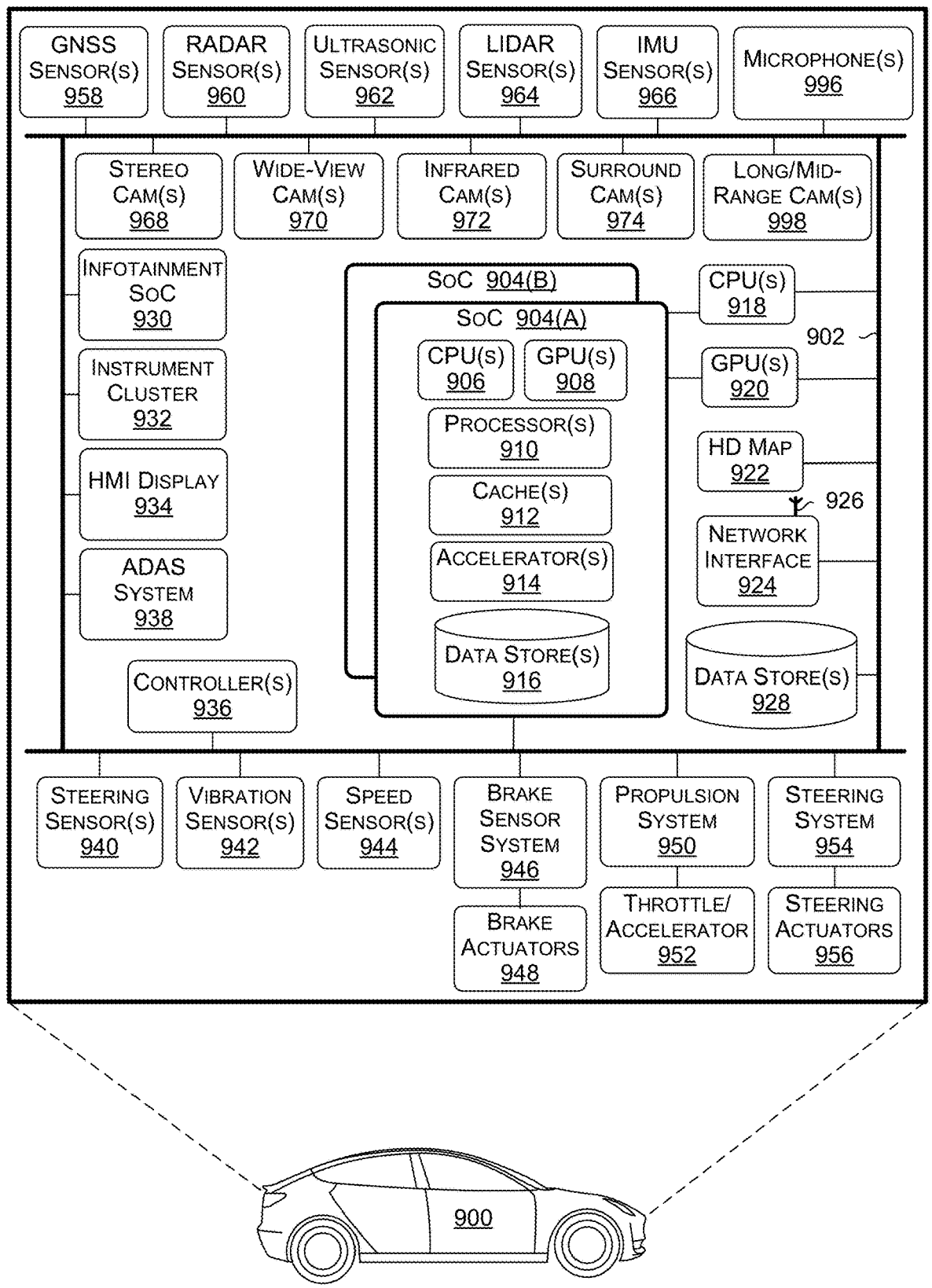
FIG. 9C is a block diagram of an example system architecture for the example autonomous or semi-autonomous vehicle or machine of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LiDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LiDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LiDAR sensor(s) 964. The LiDAR sensor(s) 964 may be used for object and pedestrian detection, emergency braking, collision avoidance, and/or other functions. The LiDAR sensor(s) 964 may be functional safety level ASIL B. In some examples, the vehicle 900 may include multiple LiDAR sensors 964 (e.g., two, four, six, etc.) that may use Ethernet (e.g., to provide data to a Gigabit Ethernet switch).

In some examples, the LiDAR sensor(s) 964 may be capable of providing a list of objects and their distances for a 360-degree field of view. Commercially available LiDAR sensor(s) 964 may have an advertised range of approximately 900 m, with an accuracy of 2 cm-3 cm, and with support for a 900 Mbps Ethernet connection, for example. In some examples, one or more non-protruding LiDAR sensors 964 may be used. In such examples, the LiDAR sensor(s) 964 may be implemented as a small device that may be embedded into the front, rear, sides, and/or corners of the vehicle 900. The LiDAR sensor(s) 964, in such examples, may provide up to a 120-degree horizontal and 35-degree vertical field-of-view, with a 200 m range even for low-reflectivity objects. Front-mounted LiDAR sensor(s) 964 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 900. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LiDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources.

Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
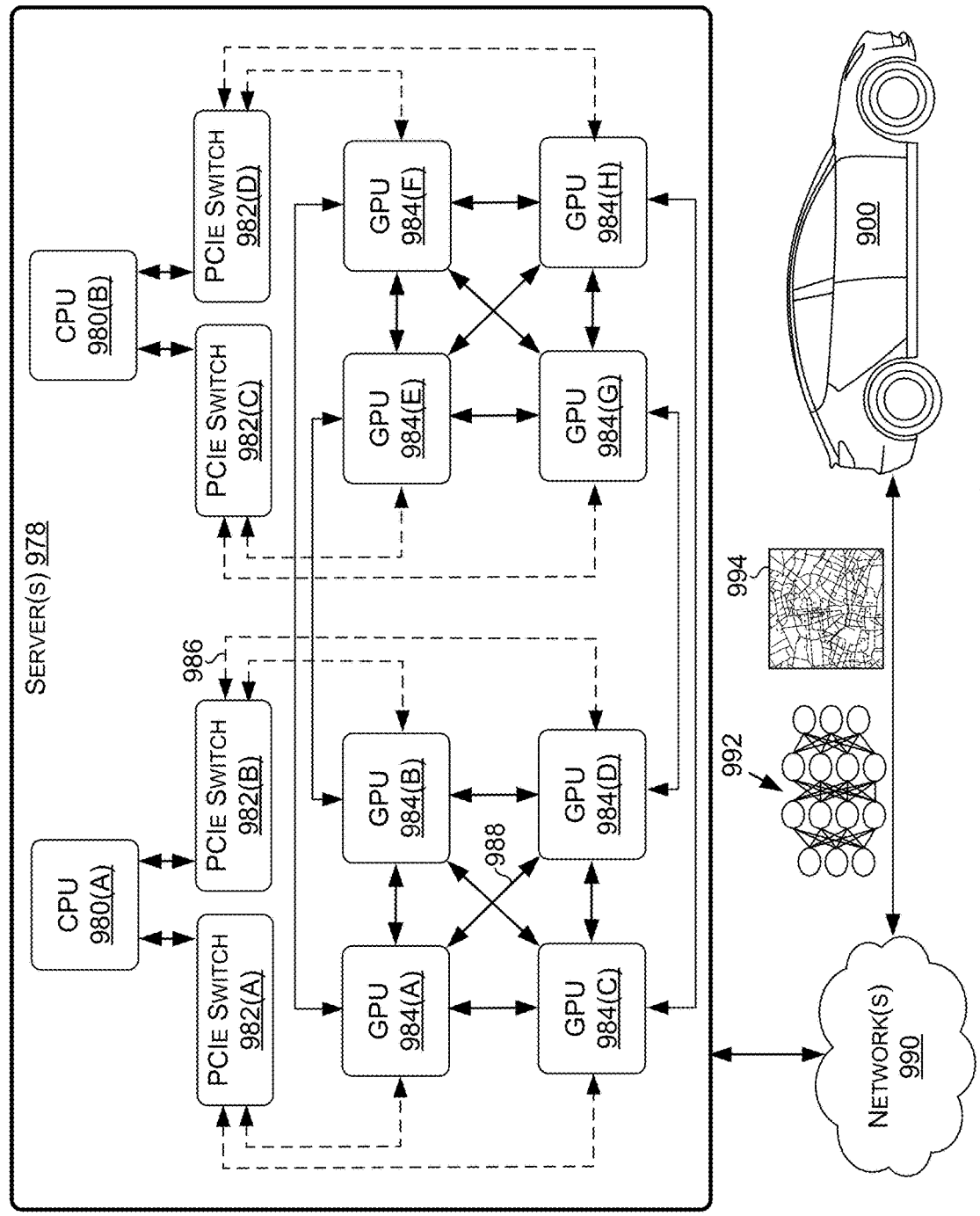
FIG. 9D is a system diagram for communication between cloud-based server(s) and the example autonomous or semi-autonomous vehicle or machine of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
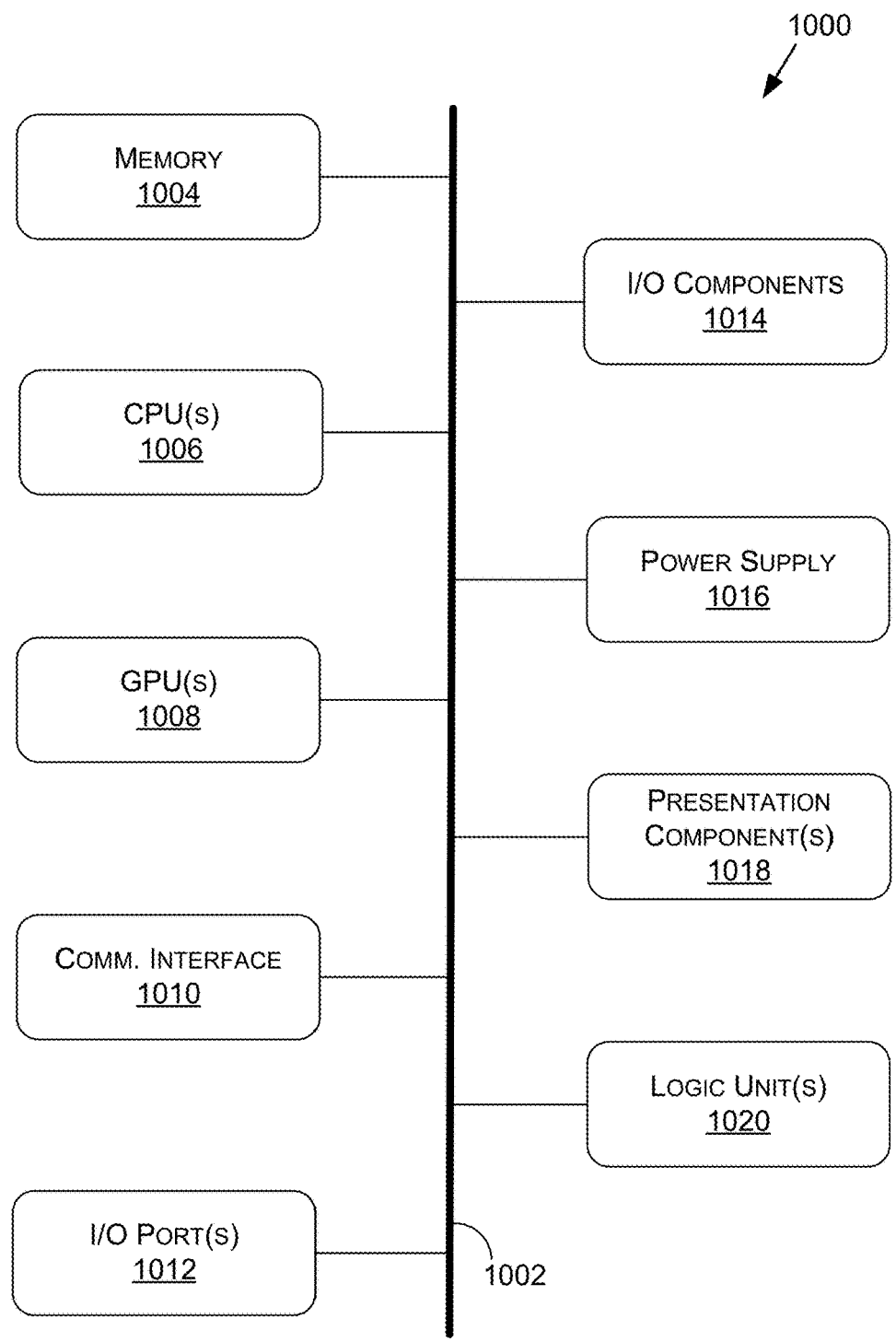
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
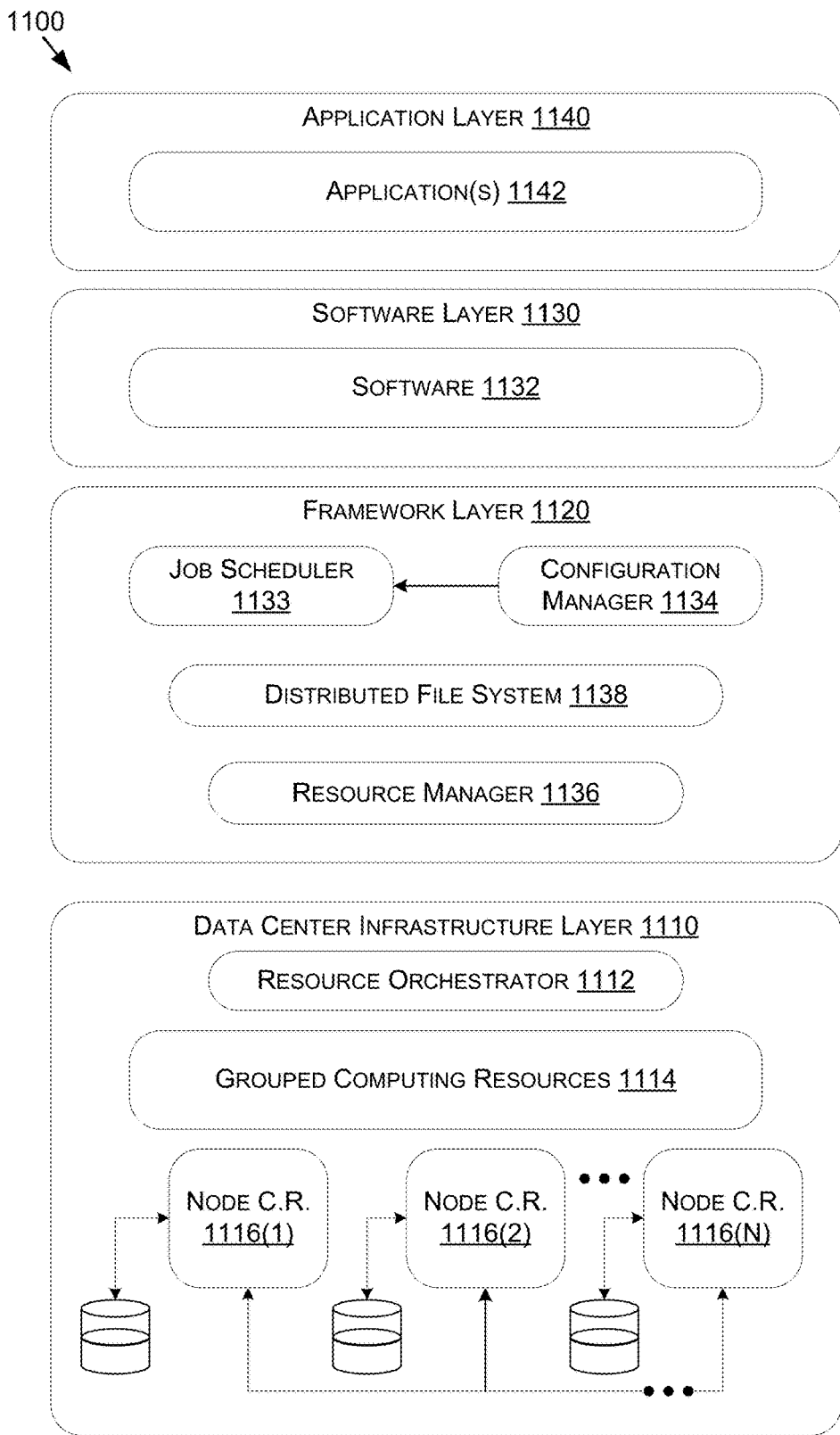
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client—server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A method comprising:
receiving ultrasonic data obtained using an ultrasonic sensor of a machine;
generating, based at least on the ultrasonic data, input data representing a top-down image indicating one or more locations of one or more objects;

generating, using one or more neural networks and based at least on the input data, at least one of a height map or an occupancy map; and performing one or more operations based at least on the at least one of the height map or the occupancy map.

2. The method of claim 1, further comprising:
determining, based at least on the ultrasonic data, the one or more locations of one or more objects,
wherein the generating the top-down image is based at least on the determining the one or more locations.

3. The method of claim 2, further comprising:
receiving second ultrasonic data obtained using a second ultrasonic sensor of the machine,
wherein the generating the input data is further based at least on the ultrasonic data.

4. The method of claim 2, wherein the top-down image represents an environment that at least partially surrounds the machine.

5. The method of claim 1, wherein the generating the input data representing the top-down images indicating the one or more locations of the one or more objects comprises:
determining, based at least on the ultrasonic data, that one or more amplitudes associated with one or more bins are equal to or greater than a threshold amplitude;
determining that the one or more bins are associated with one or more distances to the one or more objects;
determining the one or more locations based at least on the one or more distances; and
generating the input data to represent the top-down images indicating the one or more locations.

6. The method of claim 1, wherein:
the generating the at least one of the height map or the occupancy map comprises generating, using the one or more neural networks and based at least on the input data, the height map; and
the method further comprises generating the occupancy map based at least on the height map.

7. The method of claim 1, wherein the ultrasonic data is first ultrasonic data associated with a first instance in time, and wherein the method further comprises:
receiving second ultrasonic data obtained using the ultrasonic sensor, the second ultrasonic data being associated with a second instance in time subsequent the first instance in time,
wherein the generating the at least one of the height map or the occupancy map is further based at least on the second ultrasonic data.

8. The method of claim 7, further comprising:
generating, based at least on the second ultrasonic data, second input data representing a second top-down image indicating one or more second locations of one or more second objects;
aligning, based at least on a motion of the machine between the first instance in time and the second instance in time, at least the top-down image with the second top-down image; and
generating, based at least on the at least the top-down image aligned with the second top-down image, third input data representing at least a third top-down image depicting one or more third locations of one or more third objects,
wherein the generating the at least one of the height map or the occupancy map is based at least on the third input data.

9. The method of claim 1, wherein the generating of the at least one of the height map or the occupancy map comprises generating, using the one or more neural networks and based at least on the input data, a top-down map of an environment, the top-down map including at least one of one or more height indicators associated with one or more locations within the environment or one or more occupancy indicators associated with the one or more locations within the environment.

10. A system comprising:
one or more processors to:
receive sensor data obtained using one or more ultrasonic sensors of a machine;
generate, based at least on one or more amplitudes represented by the sensor data, input data representing one or more locations of one or more objects;
generate, using one or more neural networks and based at least on the input data, output data corresponding to a top-down representation of at least a portion of an environment; and
perform one or more operations by the machine based at least on the top-down representation.

11. The system of claim 10, wherein the generation of the input data representing the one or more locations of the one or more objects comprises:
determining, based at least on the sensor data, that the one or more amplitudes associated with one or more bins are equal to or greater than a threshold amplitude;
determining that the one or more bins are associated with one or more distances to the one or more objects;
determining the one or more locations based at least on the one or more distances; and
generating the input data to represent the one or more locations.

12. The system of claim 10, wherein the one or more processors are further to:
receive second sensor data obtained using a second ultrasonic sensor of the machine,
wherein the input data is further generated based at least on the second sensor data.

13. The system of claim 10, wherein the input data represents a top-down image associated with the environment, the top-down image indicating the one or more locations of the one or more objects within the environment.

14. The system of claim 10, wherein the sensor data is first sensor data associated with a first instance in time, and wherein the one or more processors are further to:
receive second sensor data obtained using the ultrasonic sensor, the second sensor data being associated with a second instance in time,
wherein the top-down representation is further generated based at least on the second sensor data.

15. The system of claim 14, wherein the one or more processors are further to:
generate first image data representing a first image depicting the one or more locations of the one or more objects;
generate, based at least on the second sensor data, second image data representing a second image depicting one or more second locations of one or more second objects;
align, based at least on a motion of the machine between the first instance in time and the second instance in time, the first image with the second image; and
generate, based at least on the first image aligned with the second image, third image data representing a third image depicting one or more third locations of one or more third objects,
wherein the input data represents the third image data.

16. The system of claim 10, wherein the top-down representation includes at least one of one or more height indicators associated with the one or more locations within the environment or one or more occupancy indicators associated with the one or more locations within the environment.

17. The system of claim 10, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing real-time streaming;
- a system for generating or presenting virtual reality (VR) content;
- a system for generating or presenting augmented reality (AR) content;
- a system for generating or presenting mixed reality (MR) content;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

18. One or more processors comprising:
processing circuitry to cause performance of one or more operations using a machine and based at least on at least one of a height map or an occupancy map, the at least one of the height map or the occupancy map generated based at least on one or more neural networks processing input data representing one or more top-down images indicating one or more locations of one or more objects, the one or more locations determined using ultrasonic data obtained using one or more ultrasonic sensors of the machine.

19. The one or more processors of claim 18, wherein the one or more processors are comprised in at least one of:
- a control system for an autonomous or semi-autonomous machine;
- a perception system for an autonomous or semi-autonomous machine;
- a system for performing simulation operations;
- a system for performing digital twin operations;
- a system for performing real-time streaming;
- a system for generating or presenting virtual reality (VR) content;
- a system for generating or presenting augmented reality (AR) content;
- a system for generating or presenting mixed reality (MR) content;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

20. The one or more processors of claim 18, wherein the one or more locations are determined using one or more amplitudes represented by the ultrasonic data.

* * * * *